US012626555B2

(12) United States Patent
Sakayama et al.

(10) Patent No.: US 12,626,555 B2
(45) Date of Patent: May 12, 2026

(54) ENTRY/EXIT MANAGEMENT SYSTEM, ENTRY/EXIT MANAGEMENT METHOD, AND RECORDING MEDIUM

(71) Applicant: NEC Corporation, Tokyo (JP)

(72) Inventors: Kazuki Sakayama, Tokyo (JP); Tatsuya Yano, Tokyo (JP); Hiroki Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 290 days.

(21) Appl. No.: 18/282,949

(22) PCT Filed: Jan. 11, 2022

(86) PCT No.: PCT/JP2022/000553
§ 371 (c)(1),
(2) Date: Sep. 19, 2023

(87) PCT Pub. No.: WO2022/201746
PCT Pub. Date: Sep. 29, 2022

(65) Prior Publication Data
US 2024/0169779 A1 May 23, 2024

(30) Foreign Application Priority Data
Mar. 23, 2021 (JP) ................................ 2021-048491

(51) Int. Cl.
G07C 9/25 (2020.01)
(52) U.S. Cl.
CPC ...... G07C 9/25 (2020.01); G06T 2207/30242 (2013.01)
(58) Field of Classification Search
CPC .................. G06T 2207/30242; G07C 9/25
See application file for complete search history.

(56) References Cited

U.S. PATENT DOCUMENTS 6,801,640 B1 * 10/2004 Okubo ..................... G07C 9/00
340/5.2
2009/0295534 A1 12/2009 Golander et al.
(Continued)

FOREIGN PATENT DOCUMENTS

DE 102018119767 A1 2/2020
JP H08-326381 A 12/1996
(Continued)

OTHER PUBLICATIONS

International Search Report for PCT Application No. PCT/JP2022/000553, mailed on Mar. 15, 2022.
(Continued)

*Primary Examiner* — Delomia L Gilliard
(74) *Attorney, Agent, or Firm* — Sughrue Mion, PLLC

(57) ABSTRACT

An entry/exit management system includes: an authentication unit that performs image authentication of a user who passes through a specific area; an attribute acquisition unit that obtains attribute information about a first user when there are the first user who has succeeded in the image authentication and a second user who has failed in the image authentication; a determination unit that determines an allowable number of people who can accompany the first user, on the basis of the attribute information; and a permission unit that permits the second user to pass through the specific area together with the first user, when the number of the second users is less than or equal to the allowable number of people.

9 Claims, 26 Drawing Sheets

(56) References Cited

U.S. PATENT DOCUMENTS

| | | | |
|---|---|---|---|
| 2013/0223699 A1 | 8/2013 | Nagashima et al. | |
| 2013/0301886 A1 | 11/2013 | Koda | |
| 2019/0340859 A1 * | 11/2019 | Trelin | ................ G06V 40/1365 |
| 2021/0209835 A1 | 7/2021 | Fonseka et al. | |
| 2022/0157073 A1 * | 5/2022 | Trelin | .................... G06V 40/00 |

FOREIGN PATENT DOCUMENTS

| | | | | | |
|---|---|---|---|---|---|
| JP | 2000-348227 | A | | 12/2000 | |
| JP | 2003288625 | A | * | 10/2003 | |
| JP | 2005-148245 | A | | 6/2005 | |
| JP | 2006-120086 | A | | 5/2006 | |
| JP | 2006-188853 | A | | 7/2006 | |
| JP | 2007122400 | A | * | 5/2007 | |
| JP | 2008014001 | A | * | 1/2008 | |
| JP | 2008-117264 | A | | 5/2008 | |
| JP | 2009-211430 | A | | 9/2009 | |
| JP | 2010-044619 | A | | 2/2010 | |
| JP | 2010211510 | A | * | 9/2010 | |
| JP | 2012133477 | A | * | 7/2012 | ............. G06F 21/32 |
| JP | 2012-164093 | A | | 8/2012 | |
| JP | 2013178702 | A | * | 9/2013 | ............. G06V 40/63 |
| JP | 2015-011597 | A | | 1/2015 | |
| JP | 2019-501473 | A | | 1/2019 | |

OTHER PUBLICATIONS

European Search Report for EP Application No. 22774551.0, dated on Sep. 2, 2024.

* cited by examiner

10: ENTRY/EXIT
MANAGEMENT SYSTEM

PLEASE SQUAT
DOWN

1

ENTRY/EXIT MANAGEMENT SYSTEM, ENTRY/EXIT MANAGEMENT METHOD, AND RECORDING MEDIUM

This application is a National Stage Entry of PCT/JP2022/000553 filed on Jan. 11, 2022, which claims priority from JP Patent Application 2021-048491 filed on Mar. 23, 2021, the contents of all of which are incorporated herein by reference, in their entirety.

TECHNICAL FIELD

This disclosure relates to technical fields of an entry/exit management system, an entry/exit management method, and a recording medium that manage entry/exit of a user.

BACKGROUND ART

A system that performs entry/exit management of a plurality of people is known as this type of system. For example, Patent Literature 1 discloses a technique/technology of detecting tailgating or piggybacking at an entrance of an apartment with automatic locks. Patent Literature 2 discloses a technique/technology of managing the entry/exit of a second registrant who accompanies a first registrant. Patent Literature 3 discloses a technique/technology of permitting the entry of a visitor, by a resident making a tailgating request.

As another related technique/technology, for example, Patent Literature 4 discloses a technique/technology of generating a depth map by imaging or photographing a user from a plurality of viewpoints. Patent Literature 5 discloses a technique/technology of extracting contours by comparing edge intensity in a search range.

CITATION LIST

Patent Literature

Patent Literature 1: JP2006-120086A
Patent Literature 2: JP2006-188853A
Patent Literature 3: JP2009-211430A
Patent Literature 4: JP2019-501473A
Patent Literature 5: JP2005-148245A

SUMMARY

Technical Problem

This disclosure aims at the disclosures of the Patent Literatures in Cited List.

Solution to Problem

An entry/exit management system according to an example aspect of this disclosure includes: an authentication unit that performs image authentication of a user who passes through a specific area; an attribute acquisition unit that obtains attribute information about a first user when there are the first user who has succeeded in the image authentication and a second user who has failed in the image authentication; a determination unit that determines an allowable number of people who can accompany the first user, on the basis of the attribute information; and a permission unit that permits the second user to pass through the specific area together with the first user, when the number of the second users is less than or equal to the allowable number of people.

An entry/exit management method according to an example aspect of this disclosure includes: performing image authentication of a user who passes through a specific area; obtaining attribute information about a first user when there are the first user who has succeeded in the image authentication and a second user who has failed in the image authentication; determining an allowable number of people who can accompany the first user, on the basis of the attribute information; and permitting the second user to pass through the specific area together with the first user, when the number of the second users is less than or equal to the allowable number of people.

A recording medium according to an example aspect of this disclosure is a recording medium on which a computer program is recorded, the computer program operating a computer to: perform image authentication of a user who passes through a specific area; obtain attribute information about a first user when there are the first user who has succeeded in the image authentication and a second user who has failed in the image authentication; determine an allowable number of people who can accompany the first user, on the basis of the attribute information; and permit the second user to pass through the specific area together with the first user, when the number of the second users is less than or equal to the allowable number of people.

DESCRIPTION OF EXAMPLE EMBODIMENTS

Hereinafter, an entry/exit management system, an entry/exit management method, a computer program, and a recording medium according to example embodiments will be described with reference to the drawings.

First Example Embodiment

An entry/exit management system according to a first example embodiment will be described with reference to FIG. 1 to FIG. 3.

(Hardware Configuration)

First, with reference to FIG. 1 a hardware configuration of an entry/exit management system 10 according to the first example embodiment will be described. FIG. 1 is a block diagram illustrating the hardware configuration of the entry/exit management system according to the first example embodiment.

Figure 1:
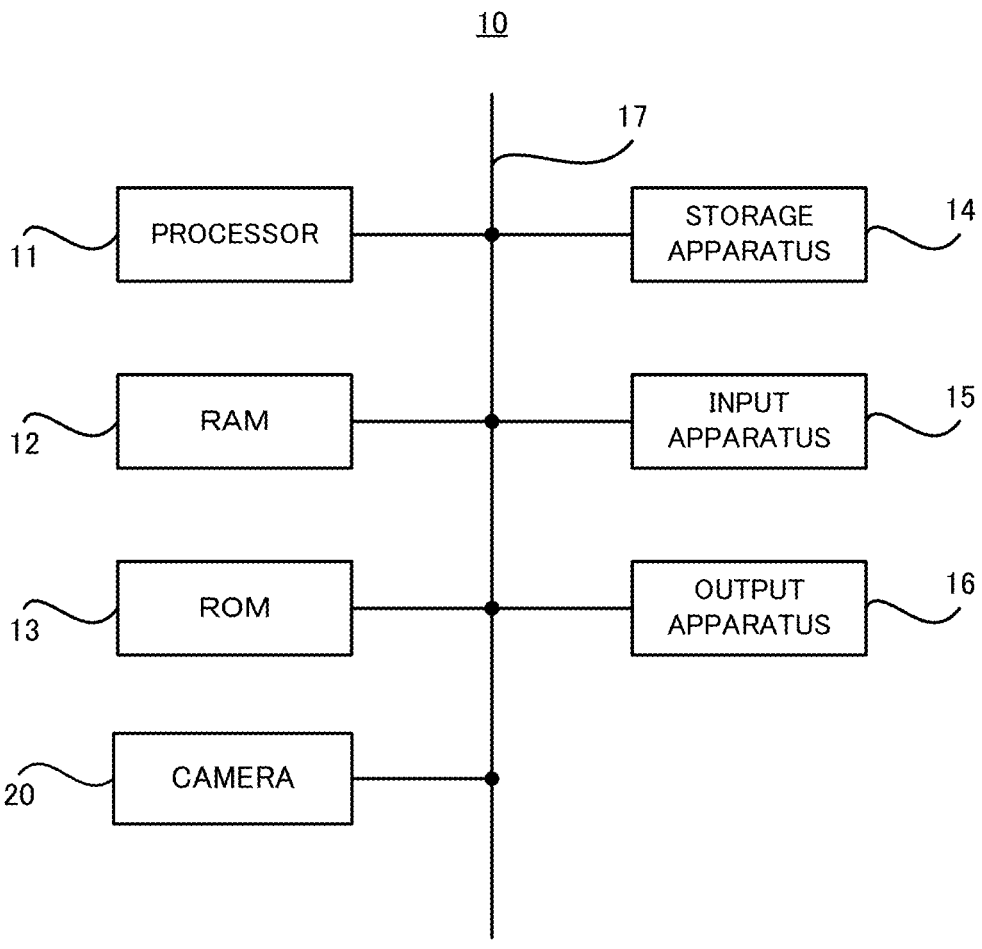
FIG. 1 is a block diagram illustrating a hardware configuration of an entry/exit management system according to a first example embodiment.

As illustrated in FIG. 1, the entry/exit management system 10 according to the first example embodiment includes a processor 11, a RAM (Random Access Memory) 12, a ROM (Read Only Memory) 13, and a storage apparatus 14. The entry/exit management system 10 may further include an input apparatus 15, an output apparatus 16, and a camera 20. The processor 11, the RAM 12, the ROM 13, the storage apparatus 14, the input apparatus 15, the output apparatus 16, and the camera 20 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium by using a not-illustrated recording medium reading apparatus. The processor 11 may obtain (i.e., may read) a computer program from a not-illustrated apparatus disposed outside the entry/exit outer system 10, through a network interface. The processor 11 controls the RAM 12, the storage apparatus 14, the input apparatus 15, and the output apparatus 16 by executing the read computer program. Especially in this example embodiment, when the processor 11 executes the read computer program, a functional block for performing a process related to entry/exit management of a user is realized or implemented in the processor 11. As the processor 11, one of a CPU (Central Processing Unit), a GPU (Graphics Processing Unit), a FPGA (field-programmable gate array), a DSP (Demand-Side Platform), and an ASIC (Application Specific Integrated Circuit) may be used, or a plurality of them may be used in parallel.

The RAM 12 temporarily stores the computer program to be executed by the processor 11. The RAM 12 temporarily stores the data that is temporarily used by the processor 11 when the processor 11 executes the computer program. The RAM 12 may be, for example, a D-RAM (Dynamic RAM).

The ROM 13 stores the computer program to be executed by the processor 11. The ROM 13 may otherwise store fixed data. The ROM 13 may be, for example, a P-ROM (Programmable ROM).

The storage apparatus 14 stores the data that is stored for a long term by the entry/exit management system 10. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the entry/exit management system 10. The input apparatus 15 may include, for example, at least one of a keyboard, a mouse, and a touch panel.

The output apparatus 16 is an apparatus that outputs information about the entry/exit management system 10 to the outside. For example, the output apparatus 16 may be a display apparatus (e.g., a display) that is configured to display the information about the entry/exit management system 10.

The camera 20 is a camera that is configured to capture an image including the user. The camera 20 may be configured, for example, as a visible-light camera, and may be configured to capture a face image of a living body. Alternatively, the camera 20 may be configured, for example, as a near infrared camera, and may be configured to capture an iris image of the living body. The camera 20 may be a camera for capturing a still image, or a camera for capturing a video. The camera 20 may be configured as a camera that is configured to obtain depth information of a subject.

(Functional Configuration)

Next, with reference to FIG. 2, a functional configuration of the entry/exit management system 10 according to the first example embodiment will be described. FIG. 2 is a block diagram illustrating the functional configuration of the entry/exit management system according to the first example embodiment.

Figure 2:
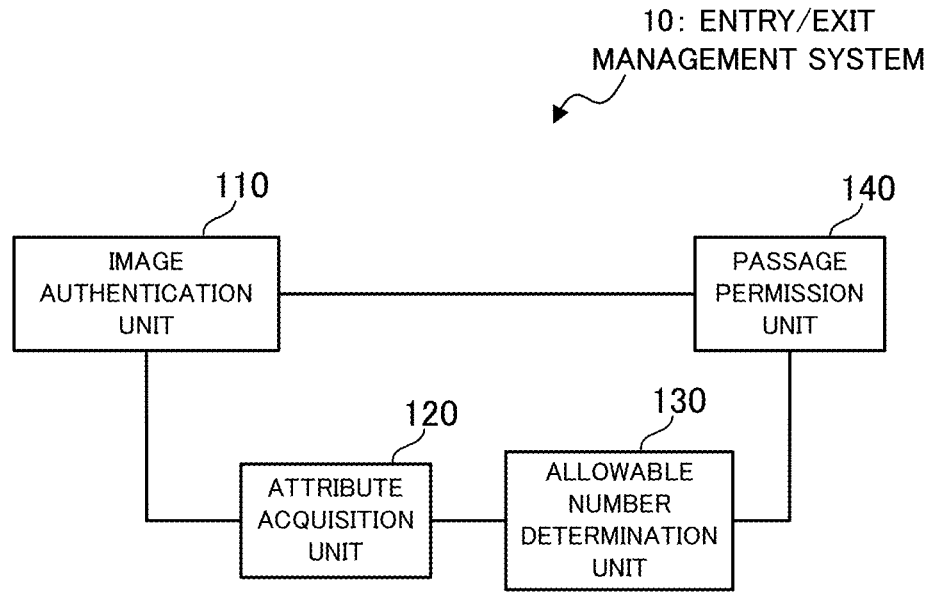
FIG. 2 is a block diagram illustrating a functional configuration of the entry/exit management system according to the first example embodiment.

As illustrated in FIG. 2, the entry/exit management system 10 according to the first example embodiment includes, as processing blocks for realizing the functions thereof, an image authentication unit 110, an attribute acquisition unit 120, an allowable number determination unit 130, and a passage permission unit 140. Each of the image authentication unit 110, the attribute acquisition unit 120, the allowable number determination unit 130, and the passage permission unit 140 may be realized or implemented in the processor 11, for example.

The image authentication unit 110 is configured to perform image authentication of the user who intends to pass through a specific area. The "specific area" here means an area through which the user can pass, and could be any area as long as the user can pass through. The image authentication unit 110 may perform an authentication process by using the image of the user obtained from the camera 20 (see FIG. 1), for example. The image authentication unit 110 may perform the authentication process by using a feature quantity of the user extracted from the image. The image authentication unit 110 may have a function for detecting a predetermined part of the user (e.g., a face, an iris, etc.) from the image, and may extract the feature quantity from the detected predetermined part. The image authentication unit 110 may collate/verify the feature quantity extracted from the image of the user and feature quantities registered in advance (i.e., feature quantities of registered users), and may determine whether or not they match each other. In this instance, the image authentication unit 110 may include a feature quantity database in which the feature quantities of the registered users are stored. The feature quantity database may include, for example, the above-described storage apparatus 14, or may include an external server of the system, or the like.

The attribute acquisition unit 120 is configured to obtain attribute information about a user who is successfully authenticated by the image authentication unit 110 (hereinafter referred to as a "first user"), of users who intend to pass through the specific area. An example of the attribute information includes a job type, a position, and a rank of the user, or the like. The attribute acquisition unit 120 may obtain the attribute information, for example, from an attribute information database in which the attribute information about the registered users is stored in advance. The attribute acquisition unit 120 may obtain the attribute information about the first user, when there is a user who has failed to be authenticated by the image authentication unit 110 (hereinafter referred to as a "second user" as appropriate). In other words, when the second user does not exist, the attribute acquisition unit 120 may not obtain the attribute information.

The allowable number determination unit 130 determines an allowable number of people who can accompany the first user and pass through the specific area, on the basis of the attribute information about the first user obtained by the attribute acquisition unit 120. The term "accompany" here refers to intentionally passing through the specific area together. For example, an example is a situation in which the first user passes through the specific area with another user (e.g., a guest of the first user, etc.) as one group. The allowable number of people who can pass through the specific area along with the first user is set in advance in response to the attribute information about the user. Specifically, the allowable number of people may be set as follows: three for a chief director; two for a section chief; and one for an ordinary employee with no managerial position. In addition, there may be an attribute in which the allowable number of people is 0 (i.e., an attribute in which the first user is not permitted to be accompanied by the second user). When there are a plurality of pieces of attribute information for one user, the allowable number of people may be determined in accordance with an attribute with the largest allowable number of people.

The passage permission unit 140 permits each user to pass through, on the basis of an authentication result of the image authentication unit 110 and the allowable number of people determined by the allowable number determination unit 130. Specifically, the passage permission unit 140 permits the passage of the user who has succeeded in the image authentication in the image authentication unit 110 (i.e., the first user), while permitting the passage of the user who has failed in the image authentication in the image authentication unit 110 (i.e., the second user), when the number of the second users is less than or equal to the allowable number of people of the first user. The number of the second users may be confirmed from the image including the second users. Assuming a case where the accurate number of people cannot be determined from the image (e.g., a case where there is a user in a blind spot), another sensor or the like may be used to detect the number of the users. For example, a motion sensor (pressure sensor) may be installed on a floor in the specific area, thereby to measure the number of people in the specific area from the weight and shapes (two feet, etc.) of people in the specific area. Then, when there is a difference between a measurement result by the sensor and an analysis result of the image, it may be determined that there is a person in the blind spot of the camera, and a face image of the person and an image of surroundings may be transmitted to a system administrator, or the like. In addition, a spotlight may be applied to the person in the blind spot, or a floor around the person may be highlighted.

The passage permission unit 140 may further have a function of notifying the user of the permission of the passage, when the user is permitted to pass through. The passage permission unit 140 may have a function of opening a gate or the like in the specific area, when the user is permitted to pass through. Alternatively, the passage permission unit 140 may have a function of sounding an alarm or notifying a security guard or the like of the presence of a suspicious person, when there is a user who is not permitted to pass through. When the security guard is notified of the presence of a suspicious person, an image of the suspicious person may be transmitted to and displayed on a terminal (a smart phone, a Smart glass, etc.) owned by the security guard or the like. Alternatively, a surveillance camera video of an entire building may be analyzed to display the shortest route to the suspicious person. In the case of the smart glass, the shortest route may be AR-displayed.

(Flow of Operation)

Next, with reference to FIG. 3, a flow of operation of the entry/exit management system according to the first example embodiment will be described. FIG. 3 is a flowchart illustrating the flow of the operation of the entry/exit management system according to the first example embodiment.

Figure 3:
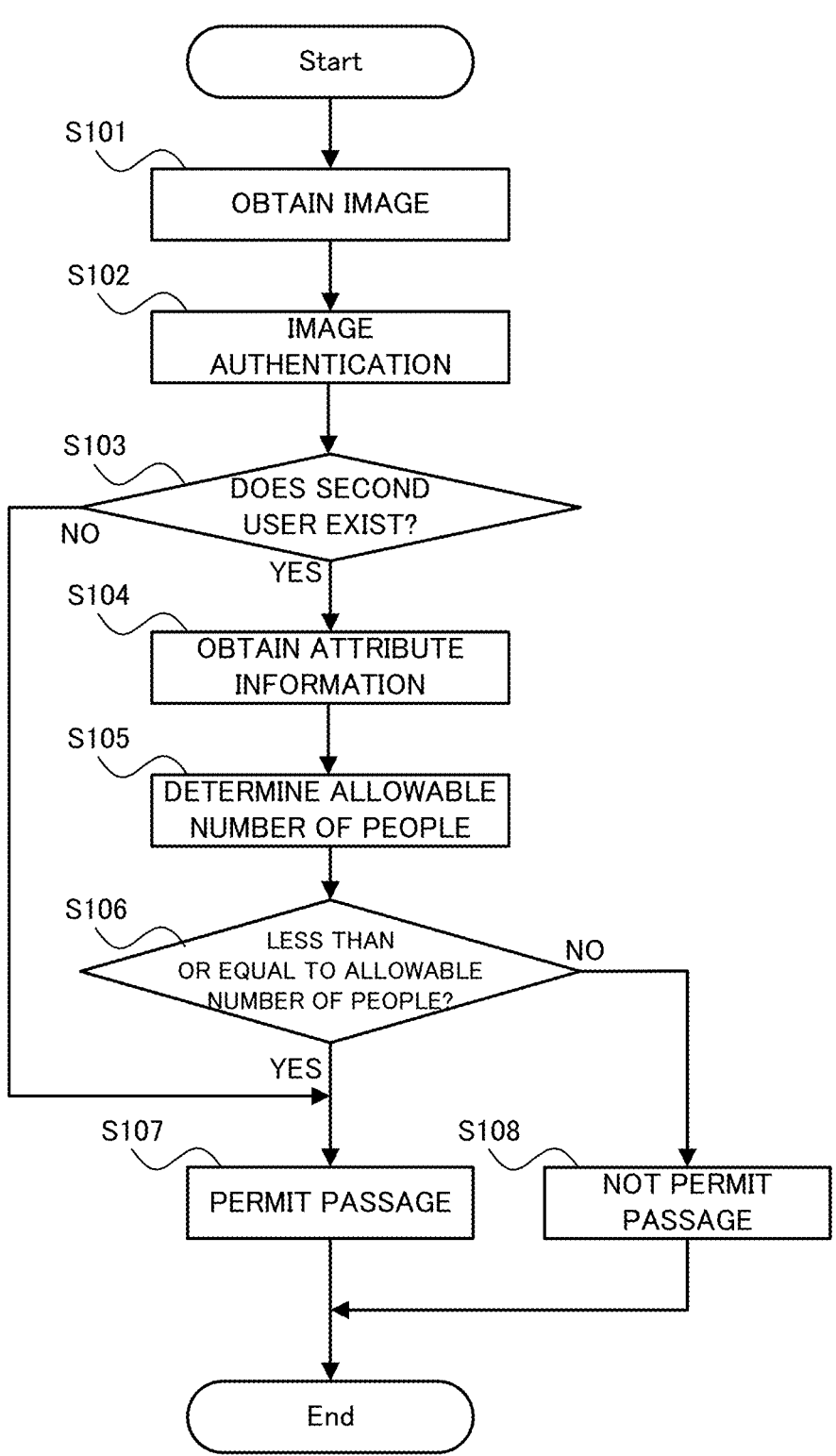
FIG. 3 is a flowchart illustrating a flow of operation of the entry/exit management system according to the first example embodiment.

As illustrated in FIG. 3, in operation of the entry/exit management system 10 according to the first example embodiment, first, the image authentication unit 110 obtains the image of the user (step S101). When there are a plurality of users, the image may be captured for each user, or the image may be captured to collectively include the plurality of users. When the plurality of users are imaged together, the image is desirably an image that allows the image authentication of each user to be performed properly (e.g., an image in which the users do not overlap each other).

Subsequently, the image authentication unit 110 performs the image authentication on the basis of the obtained image (step S102). The image authentication unit 110 determines whether or not the second user exists among the users for whom the image authentication is performed (step S103). That is, the image authentication unit 110 determines whether or not there is the user who has failed in the image authentication. In addition, when it is determined that the second user does not exist (step S103: NO), it can be determined that there is only the first user in the place (i.e., there is only the user who has succeeded in the image authentication), and therefore, the passage permission unit 140 permits the user to pass through (step S107).

On the other hand, when it is determined that the second user exists (step S103: YES), the attribute information acquisition unit 120 obtains the attribute information about the first user (step S104). Then, the allowable number determination unit 130 determines the allowable number of people on the basis of the attribute information about the first user (step S105).

Subsequently, the passage permission unit 140 determines whether or not the number of the second users is less than or equal to the allowable number of people determined by the allowable number determination unit 130 (step S106). When the number of the second users is less than or equal to the allowable number of people (step S106: YES), the passage permission unit 140 permits the second user to pass through (step S107). On the other hand, when the number of the second users is not less than or equal to the allowable number of people (step S106: NO), the passage permission unit 140 does not permit the second user to pass through (step S108).

(Technical Effect)

Next, a technical effect obtained by the entry/exit management system 10 according to the first example embodiment will be described.

As described in FIG. 1 to FIG. 3, in the entry/exit management system 10 according to the first example embodiment, when the users who intend to pass through the specific area include the first user (the user who has succeeded in the image authentication) and the second user (the user who has failed in the image authentication), the allowable number of people (i.e., the number of people who can accompany the first user) is determined on the basis of the attribute information about the first user, and when the number of the second users is less than or equal to the allowable number of people, the second user is permitted to pass through. In this way, it is possible to smoothly permit the second user (e.g., the guest of the first user, etc.) to pass through, while preventing such an action that the second user illegally passes through along with the first user (so-called, tailgating).

Second Example Embodiment

The entry/exit management system 10 according to a second example embodiment will be described with reference to FIG. 4 and FIG. 5. The second example embodiment is partially different from the first example embodiment only in the configuration and operation, and may be the same as the first example embodiment in the other parts (see FIG. 1 to FIG. 3). For this reason, a description of a part that overlaps the first example embodiment described above will be omitted below.

(Functional Configuration)

First, with reference to FIG. 4, a functional configuration of the entry/exit management system 10 according to the second example embodiment will be described. FIG. 4 is a block diagram illustrating the functional configuration of the entry/exit management system according to the second example embodiment. In FIG. 4, the same components as those illustrated in FIG. 2 carry the same reference numerals.

Figure 4:
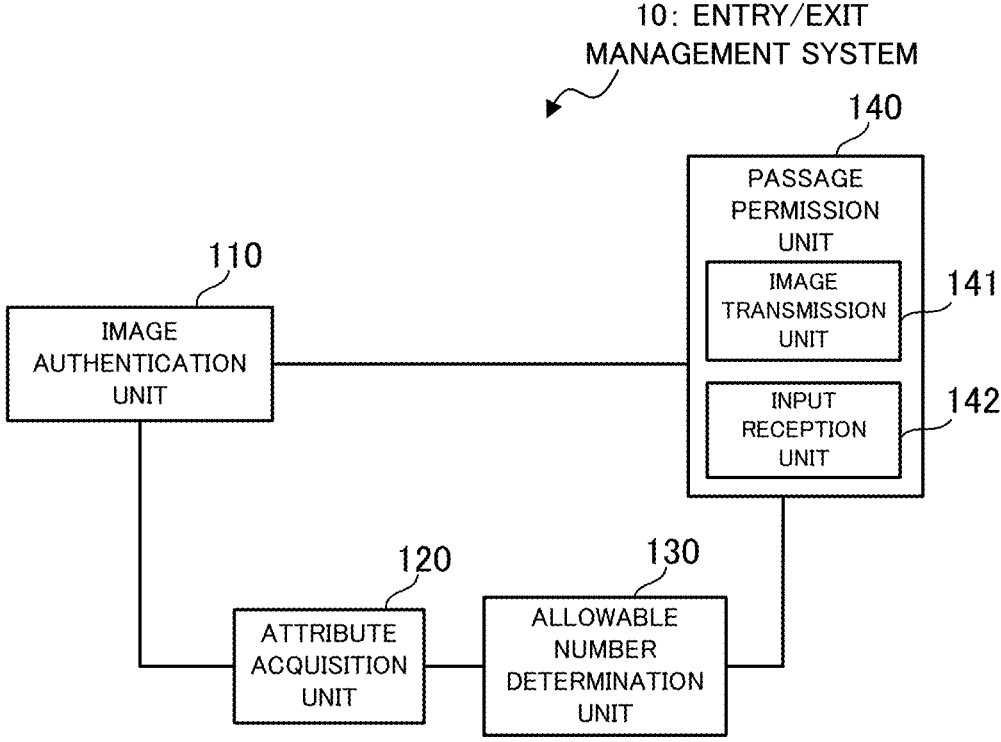
FIG. 4 is a block diagram illustrating a functional configuration of an entry/exit management system according to a second example embodiment.

As illustrated in FIG. 4, the entry/exit management system 10 according to the second example embodiment includes, as processing blocks for realizing the functions thereof, the image authentication unit 110, the attribute acquisition unit 120, the allowable number determination unit 130, and the passage permission unit 140. In particular, the passage permission unit 140 according to the second example embodiment includes an image transmission unit 141 and an input reception unit 141.

The image transmission unit 141 is configured to transmit the image of the second user to a terminal (e.g., a smart phone, etc.) owned by the first user. The image transmission unit 141 may transmit the image of the second user to the terminal of the first user, when the number of the second users is less than or equal to the allowable number of people (i.e., the number of people corresponding to the attribute of the first user). When there are a plurality of second users, the image transmission unit 141 may transmit a photograph of each person, or may transmit a photograph collectively including the plurality of second users.

The input reception unit 142 is configured to receive an input from the first user (specifically, the first user to whom the image of the second user is transmitted by the image transmission unit 141). The first user who has confirmed the transmitted image performs, for example, a selection operation of selecting the second user who is permitted as an accompanying person, from among the second users who appear in the transmitted image. For example, the first user selects the second user who is permitted as the accompanying person, by tapping an "OK" button displayed with the photograph of the second user, or by tapping the face of the second user in the image. The input reception unit 142 receives the input corresponding to the operation of the first user as described above.

(Flow of Operation)

Next, with reference to FIG. 5, a flow of operation of the entry/exit management system 10 according to the second example embodiment will be described. FIG. 5 is a flow-chart illustrating the flow of the operation of the entry/exit management system according to the second example embodiment. In FIG. 5, the same steps a those illustrated in FIG. 3 carry the same reference numerals.

Figure 5:
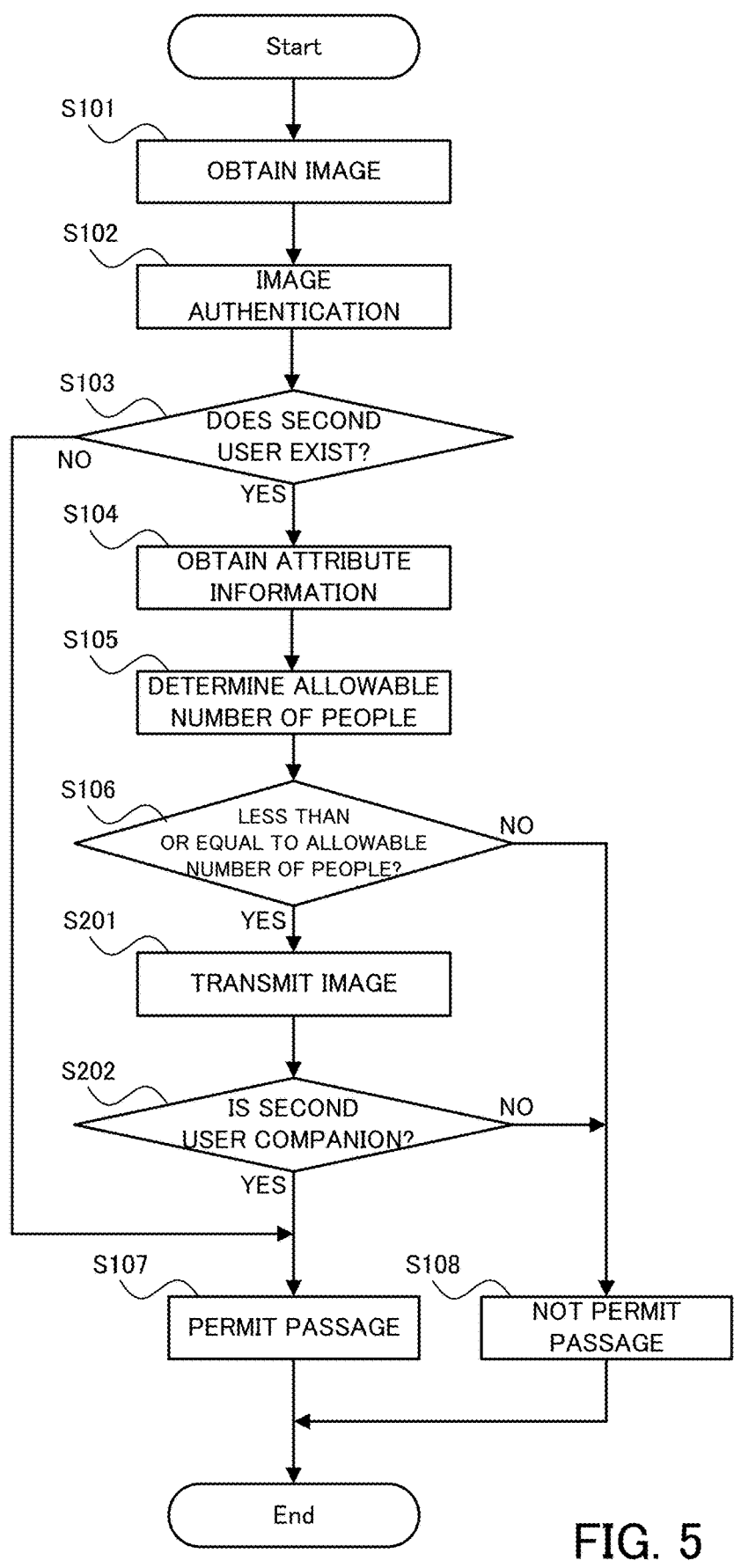
FIG. 5 is a flowchart illustrating a flow of operation of the entry/exit management system according to the second example embodiment.

As illustrated in FIG. 5, in operation of the entry/exit management system 10 according to the second example embodiment, first, the image authentication unit 110 obtains the image of the user (step S101). Subsequently, the image authentication unit 110 performs the image authentication on the basis of the obtained image (step S102).

Subsequently, the image authentication unit 110 determines whether or not the second user exists among the users for whom the image authentication is performed (step S103). When it is determined that the second user does not exist (step S103: NO) the passage permission unit 140 permits the user to pass through (step S107). On the other hand, when it is determined that the second user exists (step S103: YES), the attribute information acquisition unit 120 obtains the attribute information about the first user (step S104). Then, the allowable number determination unit 130 determines the allowable number of people on the basis of the attribute information about the first user (step S105).

Subsequently, the passage permission unit 140 determines whether or not the number of the second users is less than or equal to the allowable number of people determined by the allowable number determination unit 130 (step S106). When the number of the second users is not less than or equal to the allowable number of people (step S106: NO), the passage permission unit 140 does not permit the second user to pass through (step S108).

On the other hand, when the number of the second users is less than or equal to the allowable number of people (step S106: YES), the image transmission unit 141 transmits the image of the second user to the first user (step S201). Then, the input reception unit 142 receives the input from the first user to whom the image is transmitted, and determines whether or not the second user is permitted as the accompanying person (step S202). When there is no input from the first user, the input reception unit 142 may determine that the second user is not permitted as the accompanying person.

When the second user is permitted as the accompanying person by the first user (step S202: YES), the passage permission unit 140 permits the second user to pass through (step S107). On the other hand, when the second user is not permitted as the accompanying person by the first user (Step S202: NO), the passage permission unit 140 does not permit the second user to pass through (step S108). When a plurality of first users exist, the image of the second user may be transmitted to each of the plurality of first users. In this case, if the second user is permitted as the accompanying person by one of the plurality of first users permits to whom the image is transmitted, the second user may be permitted to pass through.

(Technical Effect)

Next, a technical effect obtained by the entry/exit management system 10 according to the second example embodiment will be described.

As described in FIG. 4 and FIG. 5, in the entry/exit management system 10 according to the second example embodiment, even when the number of the second users is less than or equal to the allowable number of people, the passage is not immediately permitted, and first, the image of the second user is transmitted to the first user. The second user is then permitted to pass through, on the basis of the first user's input with respect to the transmitted image. In this way, it is possible to prevent the unintended second user from being permitted to pass through. For example, when the first user of such an attribute that the allowable number of people is two, is accompanied by one guest (i.e., the second user), it is possible to prevent the other second user who is unrelated to the first user from being permitted to pass through.

Third Example Embodiment

The entry/exit management system 10 according to a third example embodiment will be described with reference to FIG. 6 and FIG. 7. The third example embodiment is partially different from the first and second example embodiments only in the configuration and operation, and may be the same as the first and second example embodiments in the other parts. For this reason, a description of a part that overlaps the example embodiments described above will be omitted below.

(Functional Configuration)

First, with reference to FIG. 6, a functional configuration of the entry/exit management system 10 according to the third example embodiment will be described. FIG. 6 is a block diagram illustrating the functional configuration of v entry/exit management system according to the third example embodiment. In FIG. 6, the same components as those illustrated in FIG. 2 carry the same reference numerals.

Figure 6:
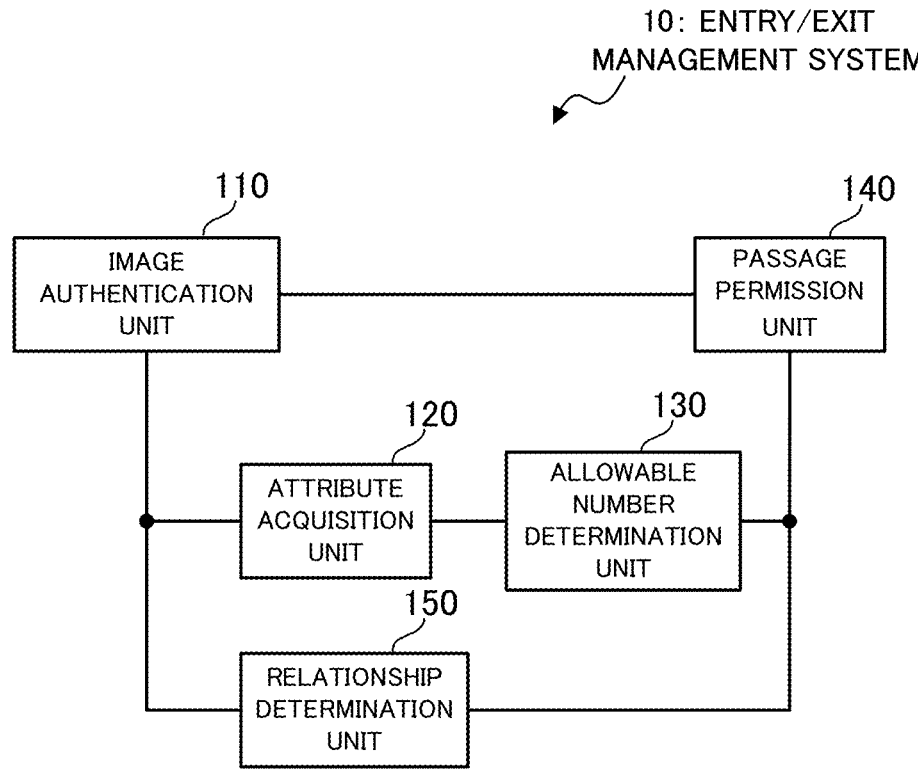
FIG. 6 is a block diagram illustrating a functional configuration of an entry/exit management system according to a third example embodiment.

As illustrated in FIG. 6, the entry/exit management system 10 according to the third example embodiment includes, as processing blocks for realizing the functions thereof, the image authentication unit 110, the attribute acquisition unit 120, the allowable number determination unit 130, the passage permission unit 140, and a relationship determination unit 150. That is, the entry/exit management system 10 according to the third example embodiment further includes the relationship determination unit 150, in addition to the configuration in the first example embodiment (see FIG. 2). The relationship determination unit 150 may be realized or implemented in the processor 11, for example.

The relationship determination unit 150 is configured to determine whether or not there is a relationship between the first user and the second user. The relationship determination unit 150 may determine whether or not there is a relationship, for example, on the basis of a distance between the first user and the second user. Specifically, the relationship determination unit 150 determines that there is a relationship when the distance between the first user and the second user is less than a predetermined distance (e.g., 1 m), and determines that there is no relationship when the distance between the first user and the second user is greater than the predetermined distance. Alternatively, the relationship determination unit 150 may determine whether or not there is a relationship on the basis of whether or not there is a conversation between the first user and the second user. Specifically, the relationship determination unit 150 may determine that there is a relationship when the first user and the second user have a conversation, and may determine that there is no relationship when the first user and the second user do not have a conversation. Whether or not they have a conversation may be determined from the image (such as a face direction, a mouth movement, gestures in the conversation, etc.), or may be determined from audio information obtained via a microphone or the like. The above determination method is merely an example, and the relationship may be determined by combining both the distance between the users and whether or not there is a conversation, or the relationship may be determined by using another method.

(Flow of Operation)

Next, with reference to FIG. 7, a flow of operation of the entry/exit management system according to the third example embodiment will be described. FIG. 7 is a flowchart illustrating the flow of the operation of the entry/exit management system according to the third example embodiment. In FIG. 7, the same steps as those illustrated in FIG. 3 carry the same reference numerals.

Figure 7:
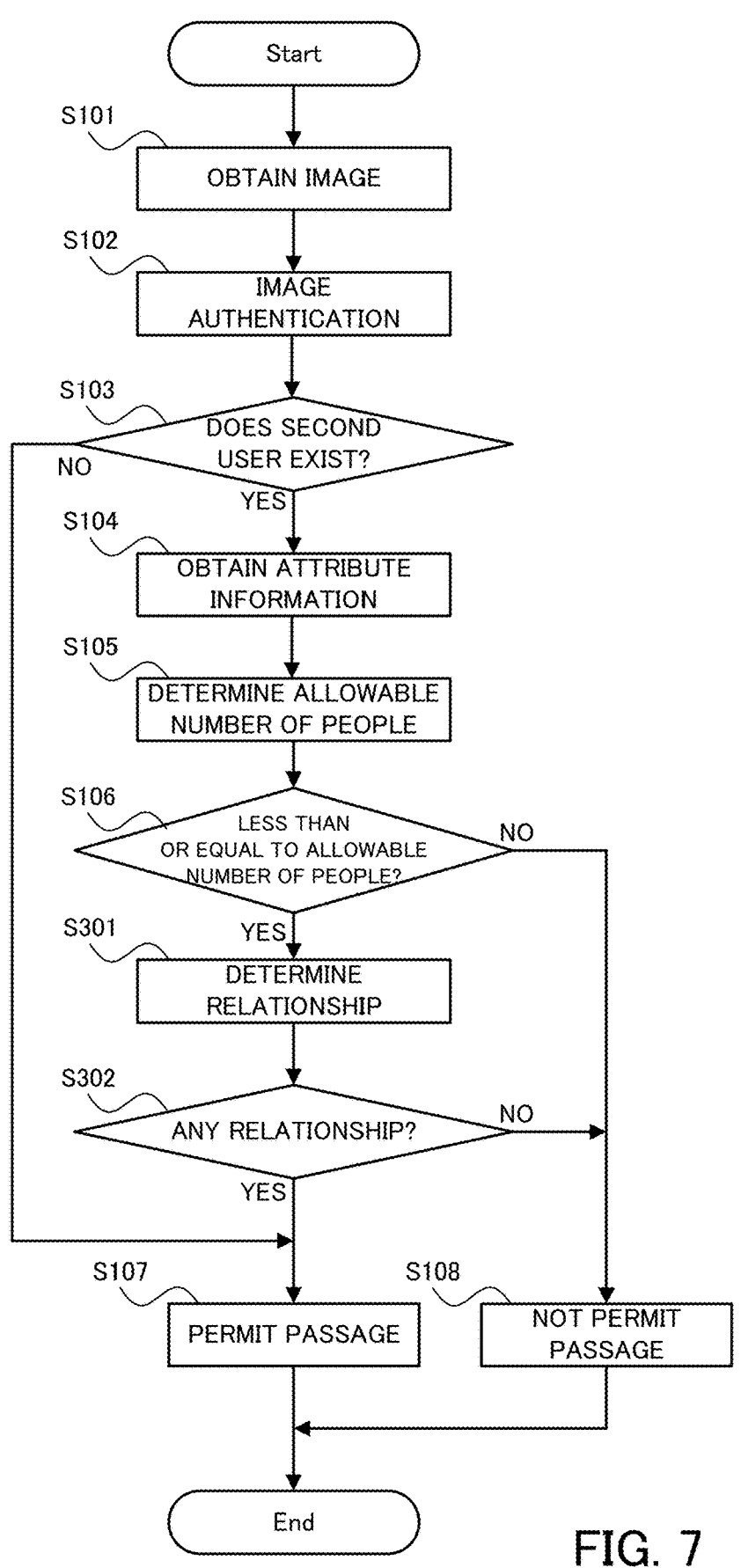
FIG. 7 is a flowchart illustrating a flow of operation of the entry/exit management system according to the third example embodiment.

As illustrated in FIG. 7, in operation of the entry/exit management system 10 according to the third example embodiment, first, the image authentication unit 110 obtains the image of the user (step S101). Subsequently, the image authentication unit 110 performs the image authentication on the basis of the obtained image (step S102).

Subsequently, the image authentication unit 110 determines whether or not the second user exists among the users for whom the image authentication is performed (step S103). When it is determined that the second user does not exist (step S103: NO) the passage permission unit 140 permits the user to pass through (step S107). On the other hand, when it is determined that the second user exists (step S103: YES), the attribute information acquisition unit 120 obtains the attribute information about the first user (step S104). Then, the allowable number determination unit 130 determines the allowable number of people on the basis of the attribute information about the first user (step S105).

Subsequently, the passage permission unit 140 determines whether or not the number of the second users is less than or equal to the allowable number of people determined by the allowable number determination unit 130 (step S106). When the number of the second users is not less than or equal to the allowable number of people (step S106: NO), the passage permission unit 140 does not permit the second user to pass through (step S108).

On the other hand, when the number of the second users is less than or equal to the allowable number of people (step S106: YES), the relationship determination unit 150 determines whether or not there is a relationship between the first user and the second user (step S301). When it is determined that there is a relationship between the first user and the second user (step S302: YES), the relationship determination unit 150 permits the second user to pass through (step S107). On the other hand, when it is determined that there is no relationship between the first user and the second user (step S302: NO), the passage permission unit 140 does not permit the second user to pass through (step S108).

(Technical Effect)

Next, a technical effect obtained by the entry/exit management system 10 according to the third example embodiment will be described.

As described in FIG. 6 and FIG. 7, in the entry/exit management system 10 according to the third example embodiment, even when the number of the second users is less than or equal to the allowable number of people, the passage is not immediately permitted, and when it is determined that there is a relationship between the first user and the second user, the second user is permitted to pass through. In this way, it is possible to prevent the second user who is unrelated to the first user from being permitted to pass through the specific area. For example, it is possible to avoid such a situation that, although the second person is unrelated to the first user, the second person is unintentionally permitted as the accompanying person and the illegal passage is permitted because of the first user's attribute that allows the first user to pass through with the accompanying person.

Fourth Example Embodiment

The entry/exit management system 10 according to a fourth example embodiment will be described with reference to FIG. 8 and FIG. 9. The fourth example embodiment is partially different from the first to third example embodiments only in the configuration and operation, and may be the same as the first to third example embodiments in the other parts. For this reason, a description of a part that overlaps the example embodiments described above will be omitted below.

(Functional Configuration)

First, with reference to FIG. 8, a functional configuration of the entry/exit management system 10 according to the fourth example embodiment will be described. FIG. 8 is a block diagram illustrating the functional configuration of the entry/exit management system according to the fourth example embodiment. In FIG. 8, the same components as those illustrated in FIG. 2 carry the same reference numerals.

Figure 8:
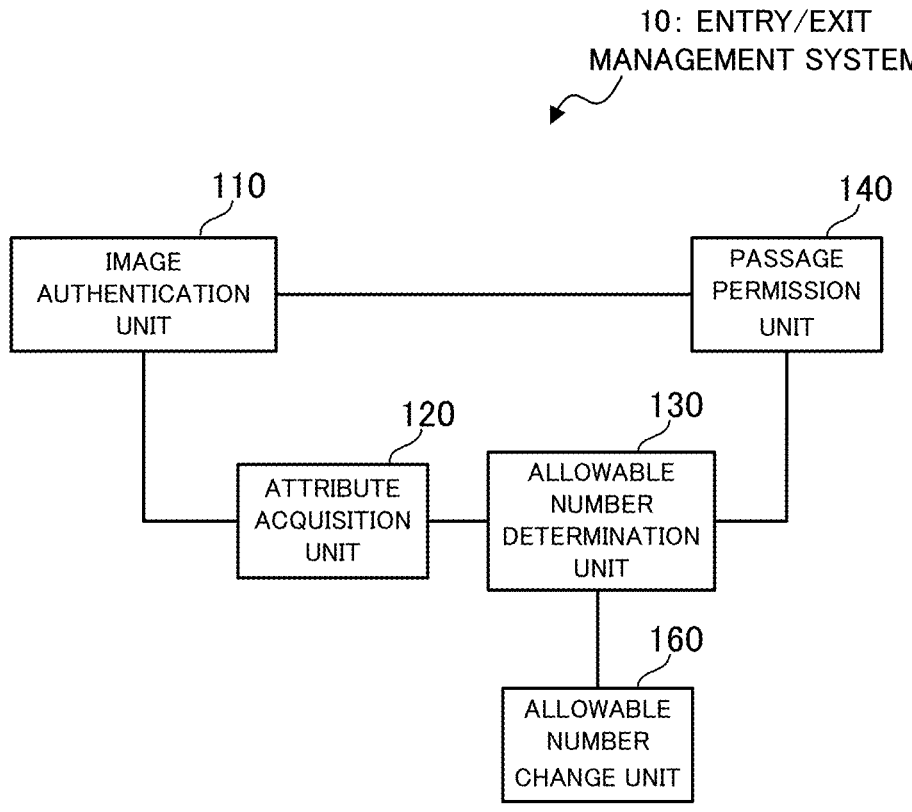
FIG. 8 is a block diagram illustrating a functional configuration of an entry/exit management system according to a fourth example embodiment.

As illustrated in FIG. 8, the entry/exit management system 10 according to the fourth example embodiment includes, as processing blocks for realizing the functions thereof, the image authentication unit 110, the attribute acquisition unit 120, the allowable number determination unit 130, the passage permission unit 140, and an allowable number change unit 160. That is, the entry/exit management system 10 according to the fourth example embodiment further includes the allowable number change unit 160, in addition to the configuration in the first example embodiment (see FIG. 2). The allowable number change unit 160 may be realized or implemented in the processor 11, for example.

The allowable number change unit 160 is configured to change the allowable number of people of the first user, on the basis of the input from the first user. That is, the allowable number change unit 160 is configured to change the allowable number of people determined from the attribute information about the first user, to the number of people corresponding to the input from the first user. The input from the first user may be, for example, a finger gesture. In this case, when the first user performs a predetermined finger gesture toward the camera 20, the allowable number of people is changed in accordance with the gesture. For example, when the first user performs a gesture of raising two fingers, the allowable number of people may be changed to two. When changing the allowable number of people, the first user may be notified to confirm whether the allowable number of people is actually to be changed. In this case, after the user agrees to the change in the allowable number of people, the allowable number of people may be changed.

Among the first users, there may be the first user who is permitted to change the allowable number of people and the first user who is not permitted to change the allowable number or people. These may be divided, for example, in accordance with the attribute information about the user. For example, the first user with a high position may be permitted to change the allowable number of people, while the first user with a low position may not be permitted to change the allowable number of people. In this case, even if the input (e.g., the finger gesture) is made to change the allowable number of people by the first user who is not permitted to change the allowable number of people, the allowable number of people is not changed.

(Flow of Operation)

Next, with reference to FIG. 9, a flow of operation of the entry/exit management system according to the fourth example embodiment will be described. FIG. 9 is a flow-chart illustrating the flow of the operation of the entry/exit management system according to the fourth example embodiment. In FIG. 9, the same steps as those illustrated in FIG. 3 carry the same reference numerals.

Figure 9:
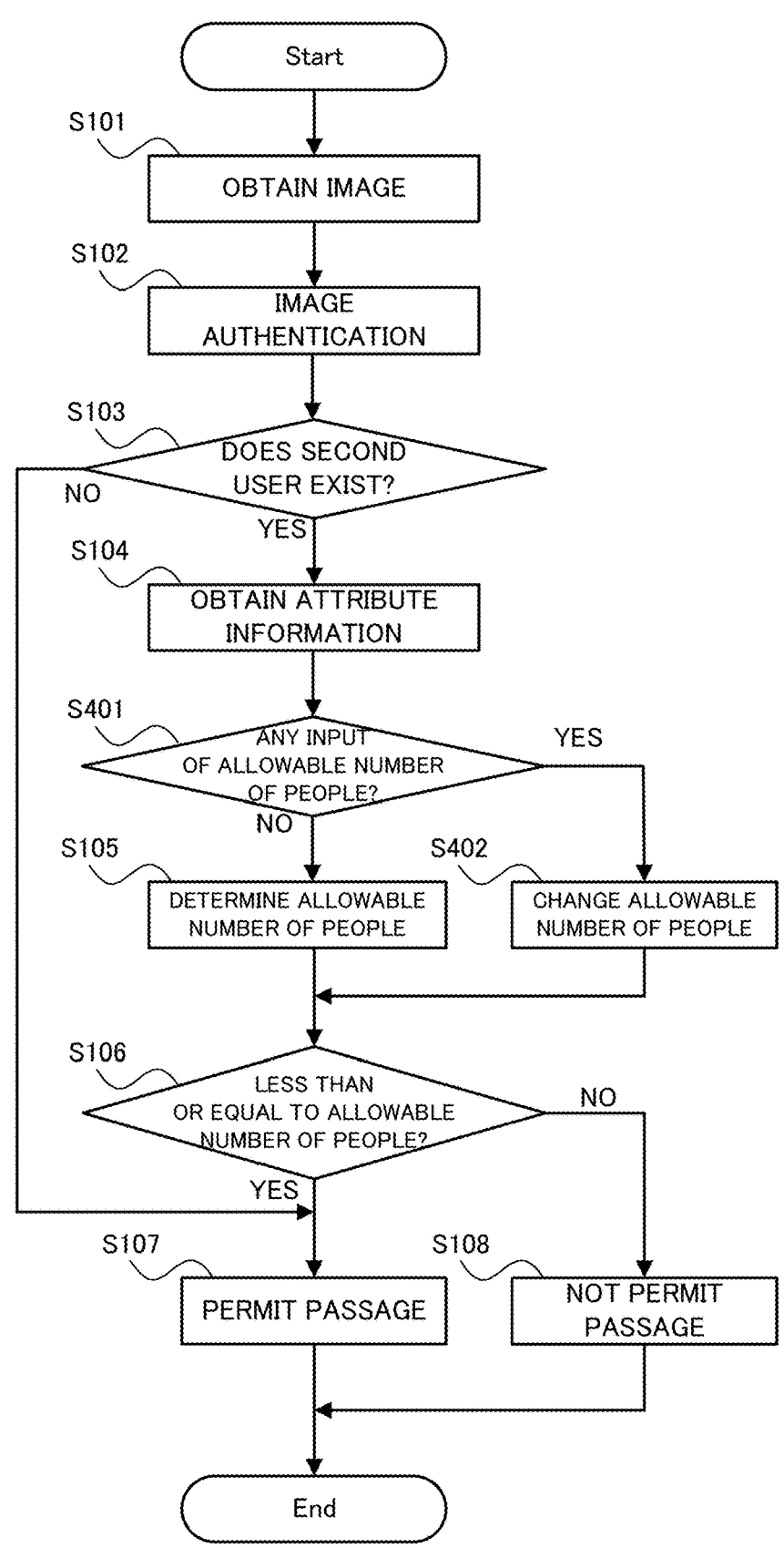
FIG. 9 is a flowchart illustrating a flow of operation of the entry/exit management system according to the fourth example embodiment.

As illustrated in FIG. 9, in operation of the entry/exit management system 10 according to the fourth example embodiment, first, the image authentication unit 110 obtains the image of the user (step S101). Subsequently, the image authentication unit 110 performs the image authentication on the basis of the obtained image (step S102).

Subsequently, the image authentication unit 110 determines whether or not the second user exists among the users for whom the image authentication is performed (step S103). When it is determined that the second user does not exist (step S103: NO) the passage permission unit 140 permits the user to pass through (step S107). On the other hand, when it is determined that the second user exists (step S103: YES), the attribute information acquisition unit 120 obtains the attribute information about the first user (step S104).

Subsequently, the allowable number change unit 160 determines whether or not the input is made to change the allowable number of people by the first user (step S401). When the input is not made to change the allowable number of people (step S401: NO), the allowable number determination unit 130 determines the allowable number of people on the basis of the attribute information about the first user (step S105). On the other hand, when the input is made to change the allowable number of people (step S401: YES), the allowable number change unit 160 changes the allowable number of people in accordance with the input from the first user (step 402). When the allowable number of people is changed, the determination of the allowable number of people by the allowable number determination unit 130 (i.e., the determination of the allowable number of people based on the attribute information about the first user) is not performed. Therefore, when the input is made to change the allowable number of people from the first user before the attribute information is obtained, the acquisition of the attribute information may be omitted.

Subsequently, the passage permission unit 140 determines whether or not the number of the second users is less than or equal to the allowable number of people (the allowable number of people determined by the allowable number determination unit 130, or the allowable number of people changed by the allowable number change unit 160) (step S106). When the number of the second users is less than or equal to the allowable number of people (step S106: YES), the passage permission unit 140 permits the second user to pass through (step S107). On the other hand, when the number of the second users is not less than or equal to the allowable number of people (step S106: NO), the passage permission unit 140 does not permit the second user to pass through (step S108).

(Technical Effect)

Next, a technical effect obtained by the entry/exit management system 10 according to the fourth example embodiment will be described.

As described in FIG. 8 and FIG. 9, in the entry/exit management system 10 according to the fourth example embodiment, the allowable number of people may be changed on the basis of the input from the first user. In this way, more flexible response is possible, as compared with the case where the allowable number of people cannot be changed (i.e., when the allowable number of people is determined only by the attribute information). For example, when the first user is accompanied by more guests than the allowable number of people that is determined by the own attribute information, it is possible to certainly permit all the guests to pass through, by increasing the allowable number of people. Alternatively, when the first user is accompanied by fewer guests than the allowable number of people that is determined by the own attribute information, it is possible to prevent the unintended second user from being permitted to pass through, by reducing the allowable number of people.

Fifth Example Embodiment

The entry/exit management system 10 according to a fifth example embodiment will be described with reference to FIG. 10 and FIG. 11. The fifth example embodiment is partially different from the first to fourth example embodiments only in the configuration and operation, and may be the same as the first to fourth example embodiments in the other parts. For this reason, a description of a part that overlaps the example embodiments described above will be omitted below.

(Functional Configuration)

First, with reference to FIG. 10, a functional configuration of the entry/exit management system 10 according to the fifth example embodiment will be described. FIG. 10 is a block diagram illustrating the functional configuration of the entry/exit management system according to the fifth example embodiment. In FIG. 10, the same components as those illustrated in FIG. 2 carry the same reference numerals.

As illustrated in FIG. 4, the entry/exit management system 10 according to the fifth example embodiment includes, as processing blocks for realizing the functions thereof, the image authentication unit 110, the attribute acquisition unit 120, the allowable number determination unit 130, and the passage permission unit 140. In particular, the allowable number determination unit 130 according to the fifth example embodiment includes a number summing unit 131.

The number summing unit 131 is configured to calculate a total allowable number of people by summing up the allowable number of people determined for each of a plurality of first users, when there are the plurality of first users. For example, when the allowable number of people of a first user 1 is three, the allowable number of people of a first user 2 is two, and the allowable number of people of a first user 3 is two, the number summing unit 131 calculates three people+two people+two people=seven people, as the total allowable number of people. When the total allowable number of people is calculated, the passage permission unit 140 permits the second user to pass through the specific area on the basis of the total allowable number of people.

(Flow of Operation)

Next, with reference to FIG. 11, a flow of operation of the entry/exit management system according to a fifth example embodiment will be described. FIG. 11 is a flowchart illustrating the flow of the operation of the entry/exit management system according to the fifth example embodiment. In FIG. 11, the same steps as those illustrated in FIG. 3 carry the same reference numerals.

Figure 11:
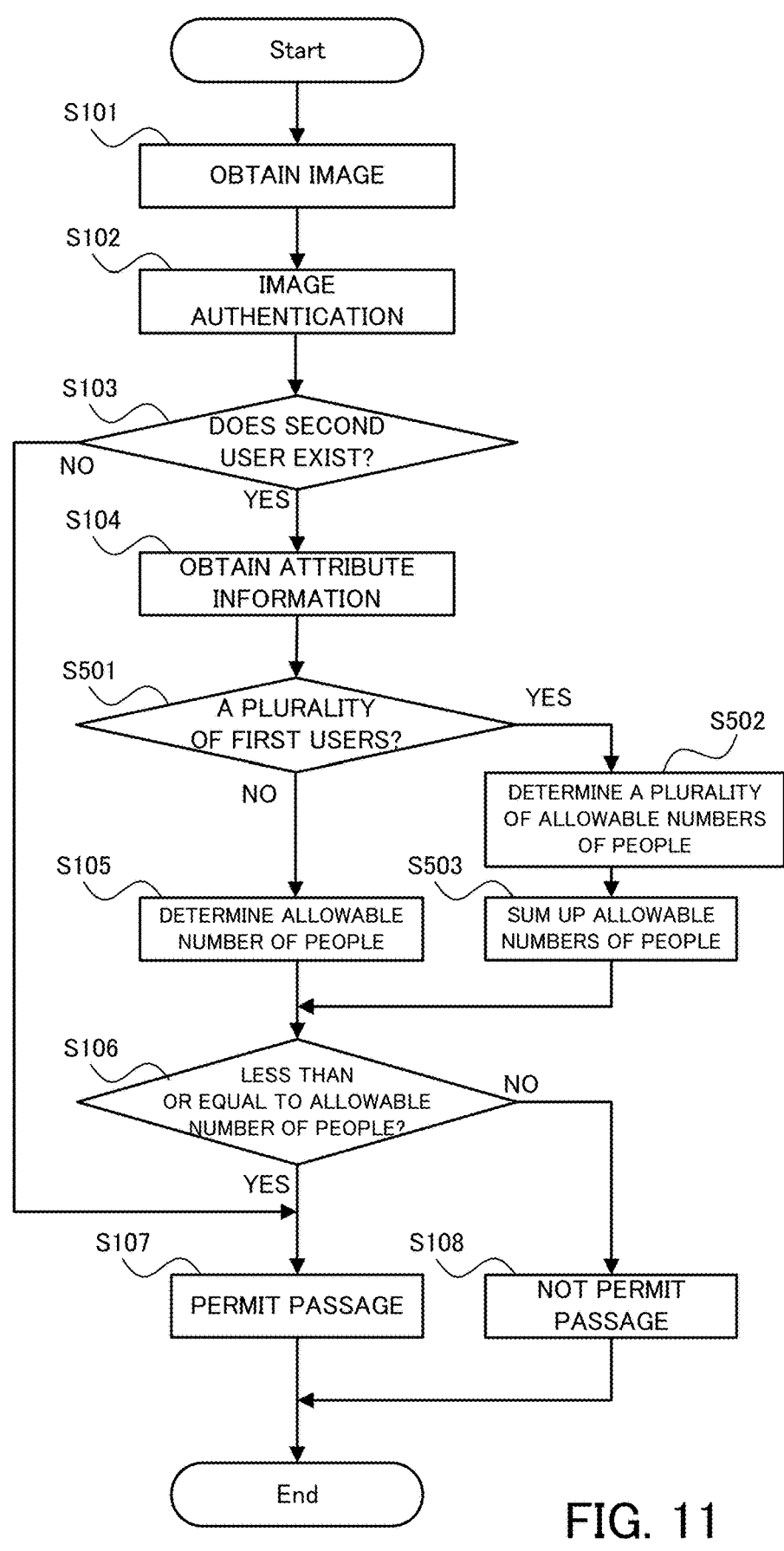
FIG. 11 is a flowchart illustrating a flow of operation of the entry/exit management system according to the fifth example embodiment.

As illustrated in FIG. 11, in operation of the entry/exit management system 10 according to the fifth example embodiment, first, the image authentication unit 110 obtains the image of the user (step S101). Subsequently, the image authentication unit 110 performs the image authentication on the basis of the obtained image (step S102).

Subsequently, the image authentication unit 110 determines whether or not the second user exists among the users for whom the image authentication is performed (step S103). When it is determined that the second user does not exist (step S103: NO) the passage permission unit 140 permits the user to pass through (step S107). On the other hand, when it is determined that the second user exists (step S103: YES), the attribute information acquisition unit 120 obtains the attribute information about the first user (step S104).

Subsequently, the allowable number determination unit 130 determines whether or not there are a plurality of first users (step S501). When it is determined that there are no plurality of first users (step S501: NO), the allowable number determination unit 130 determines the allowable number of people on the basis of the attribute information about the first user (step S105). That is, the allowable number of people is determined for a single first user. On the other hand, when it is determined that there are a plurality of first users (step S501: YES), the allowable number determination unit 130 respectively determines the allowable numbers of people, on the basis of a plurality of pieces of the attribute information about the first users (step S502).

That is, the allowable number of people is determined for each of the plurality of first users. Then, the number summing unit 131 sums up the allowable numbers of people of the plurality of first users, and calculates the total allowable number of people (step S503).

Subsequently, the passage permission unit 140 determines whether or not the number of the second users is less than or equal to the allowable number of people (the total allowable number of people when the total allowable number of people is calculated in the number summing unit 131) (step S106). When the number of the second users is less than or equal to the allowable number of people (step S106: YES), the passage permission unit 140 permits the second user to pass through (step S107). On the other hand, when the number of the second users is not less than or equal to the allowable number of people (step S106: NO), the passage permission unit 140 does not permit the second user to pass through (step S108).

(Technical Effect)

Next, a technical effect obtained by the entry/exit management system 10 according to the fifth example embodiment will be described.

Figure 10:
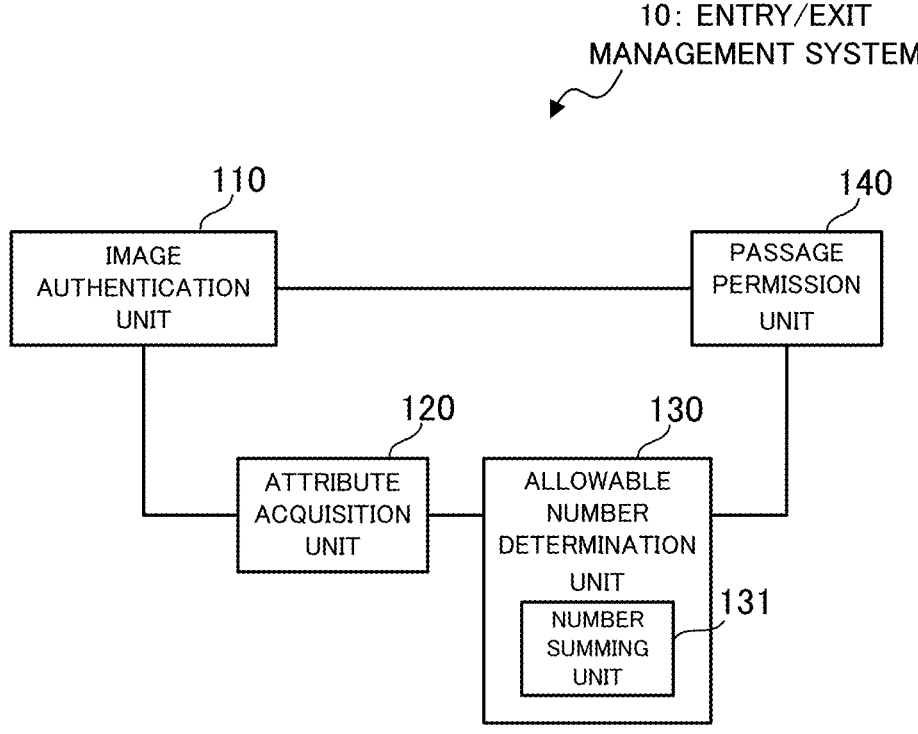
FIG. 10 is a block diagram illustrating a functional configuration of an entry/exit management system according to a fifth example embodiment.

As described in FIG. 10 and FIG. 11, in the entry/exit management system 10 according to the fifth example embodiment, when there are a plurality of first users, the respective allowable numbers of people of the first users are summed up to calculate the total allowable number of people. In this way, even when each of the plurality of first users intends to be accompanied by the second user, it is possible to properly permit the passage. For example, it is possible to avoid such a situation that, although there are a plurality of first users, the permission of the passage is determined only by the allowable number of people of one of the plurality of first users, and that the second user to be desirably passed through is not permitted to pass through.

Sixth Example Embodiment

The entry/exit management system 10 according to a sixth example embodiment will be described with reference to FIG. 12 to FIG. 16. The sixth example embodiment is partially different from the first to fifth example embodiments only in the configuration and operation, and may be the same as the first to fifth example embodiments in the other parts. For this reason, a description of a part that overlaps the example embodiments described above will be omitted below.

(Functional Configuration)

Figure 12:
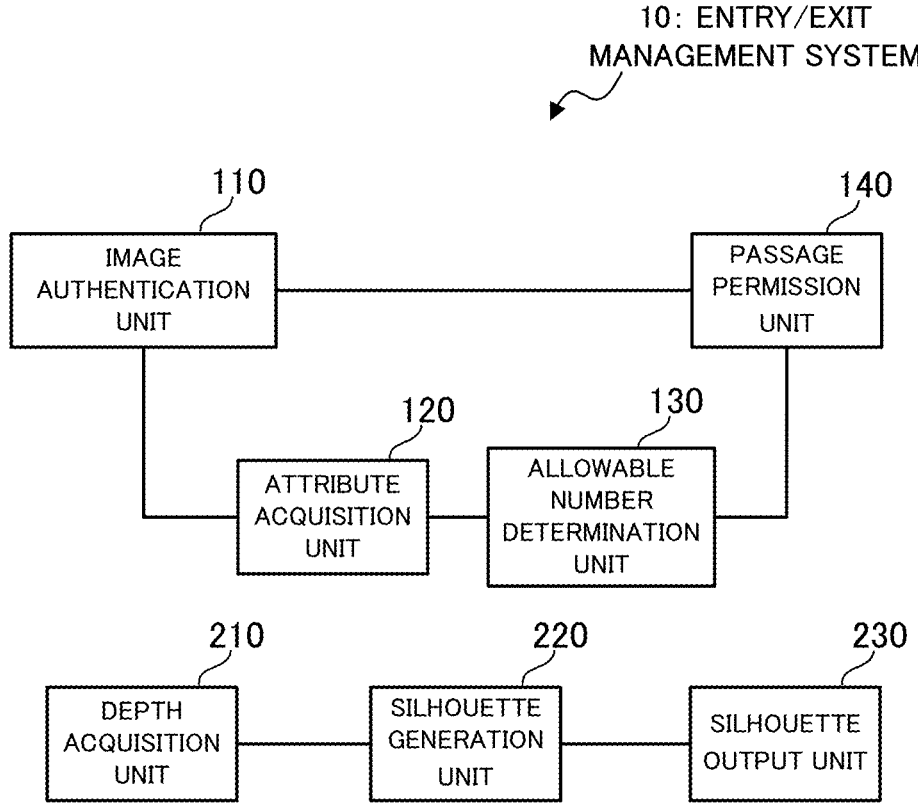
FIG. 12 is a block diagram illustrating a functional configuration of an entry/exit management system according to a sixth example embodiment.

First, with reference to FIG. 12, a functional configuration of the entry/exit management system 10 according to the sixth example embodiment will be described. FIG. 12 is a block diagram illustrating the functional configuration of the entry/exit management system according to the sixth example embodiment. In FIG. 12, the same components as those illustrated in FIG. 2 carry the same reference numerals.

As illustrated in FIG. 12, the entry/exit management system 10 according to the sixth example embodiment includes, as processing blocks for realizing the functions thereof, the image authentication unit 110, the attribute acquisition unit 120, the allowable number determination unit 130, the passage permission unit 140, a depth acquisition unit 210, a silhouette generation unit 220, and a silhouette output unit 230. That is, the entry/exit management system 10 according to the sixth example embodiment further includes the depth acquisition unit 210, the silhouette generation unit 220, and the silhouette output unit 230, in addition to the configuration in the first example embodiment (see FIG. 2). Each of the depth acquisition unit 210, the silhouette generation unit 220, and the silhouette output unit 230 may be realized or implemented in the processor 11, for example.

The depth acquisition unit 210 is configured to obtain depth information (in other words, information on depth) about the user who intends to pass through the specific area. The depth information may be obtained as a depth image by using a depth camera, for example. The depth information may be obtained by imaging the user with a plurality of cameras having different viewpoints. Alternatively, the depth information may be obtained by using another depth sensor or the like. When the depth information is obtained by the camera 20, the camera used to capture the image for the image authentication and the camera used to obtain the depth information may be separately provided, or may be a common camera.

The silhouette generation unit 220 is configured to generate a silhouette image of the user (i.e., an image indicating an outer edge of the user) on the basis of the depth information obtained by the depth acquisition unit 210. The silhouette generation unit 220 may generate the silhouette image by detecting a border between "a part with a depth of 0" and "another part" in the depth image, for example. A method of generating the silhouette image, however, is not particularly limited. When there are a plurality of users, the silhouette generation unit 220 may generate the silhouette image for each of the plurality of users.

The silhouette output unit 230 is configured to output the image generated by the silhouette generation unit 220. The silhouette output unit 230 may output the silhouette image to a display or the like provided in the output apparatus 16 (FIG. 1), for example. The silhouette image may be outputted to be displayed to the user, or may be outputted to be displayed to a system administrator or the like, for example. The silhouette image may be displayed to the user, while an image other than the silhouette image may be displayed to the system administrator or the like.

(Flow of Operation)

Figure 13:
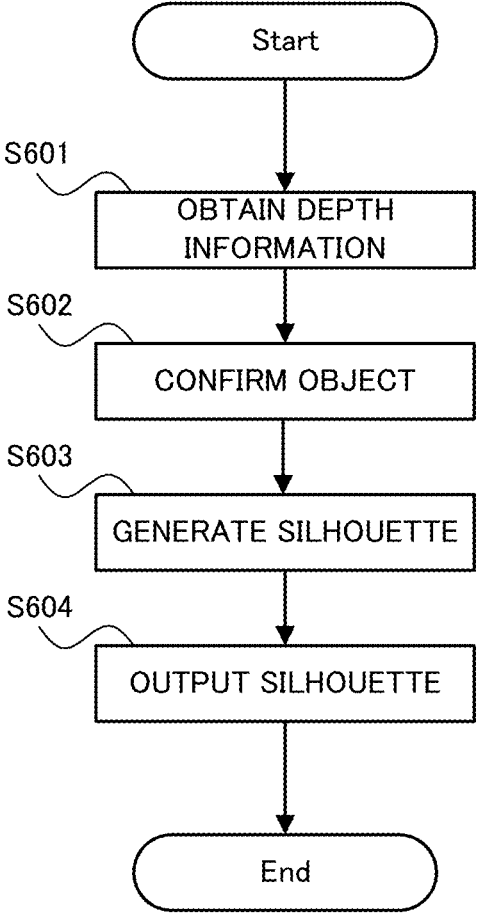
FIG. 13 is a flowchart illustrating a flow of operation related to a silhouette image of the entry/exit management system according to the sixth example embodiment.

Next, with reference to FIG. 13, a flow of operation related to the silhouette image in the entry/exit management system 10 according to the sixth example embodiment will be described. FIG. 13 is a flowchart illustrating the flow of the operation related to the silhouette image of the entry/exit management system according to the sixth example embodiment.

As illustrated in FIG. 13, when the entry/exit management system 10 according to the sixth example embodiment outputs the silhouette image, first, the depth acquisition unit 210 obtains the depth information (step S601). The depth information obtained by the depth acquisition unit 210 is outputted to the silhouette generation unit 220.

Subsequently, the silhouette generation unit 220 confirms a position or a shape of an object (in this case, the user) from the depth information (step S602). Then, the silhouette generation unit 220 generates the silhouette image of the confirmed object (step S603). The generated silhouette image is outputted by the silhouette output unit 230 (step S604).

A series of the processing steps described above may be performed in parallel with the process of the passage permission based on the image authentication and the allowable number of people described in the first to fifth example embodiments (see FIG. 2). For example, the silhouette image may be displayed when the image authentication of the user (especially, image capturing) is performed, or may be displayed when the determination is made with respect to the passage permission for the user.

Display Examples of Silhouette Image

Figure 14:
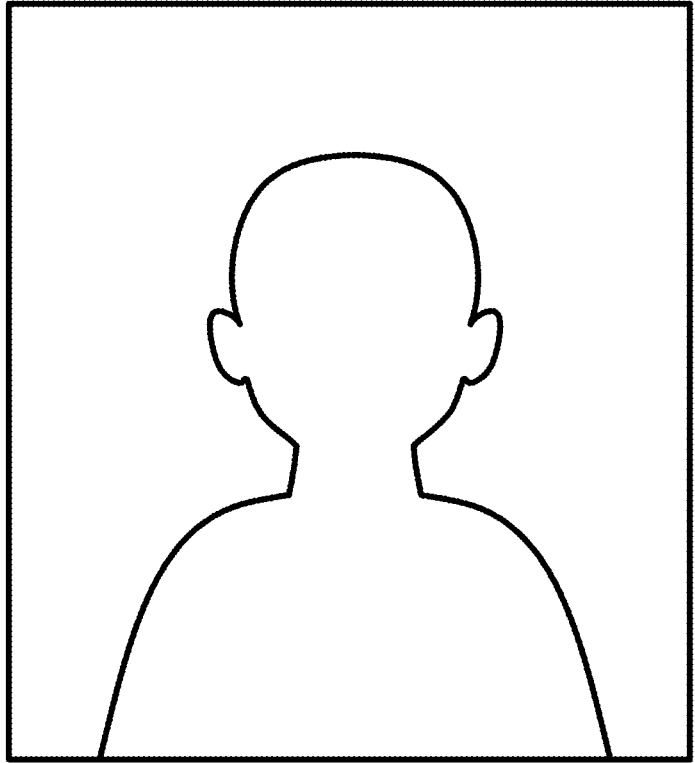
FIG. 14 is a conceptual diagram illustrating an example of the silhouette image.
Figure 15:
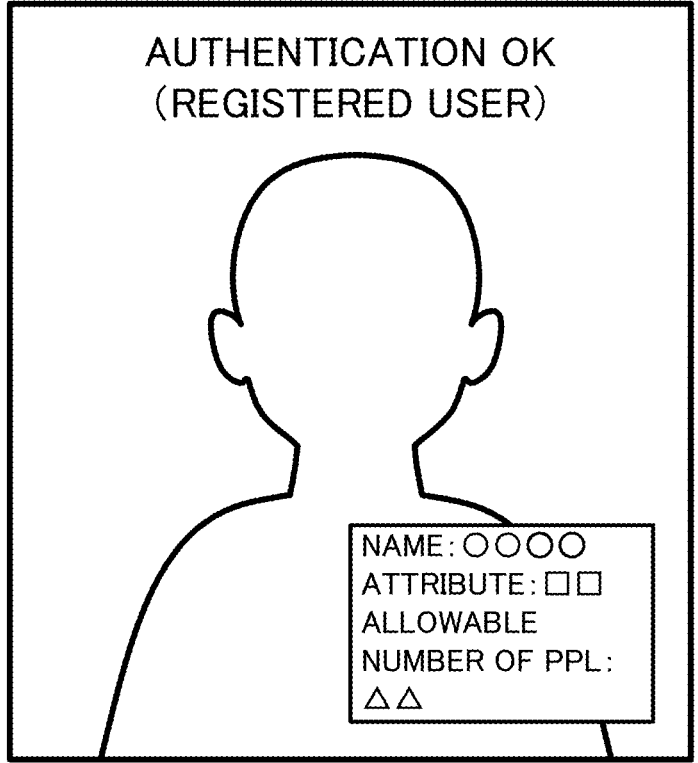
FIG. 15 is a conceptual diagram illustrating a display example of a silhouette image of a first user.
Figure 16:
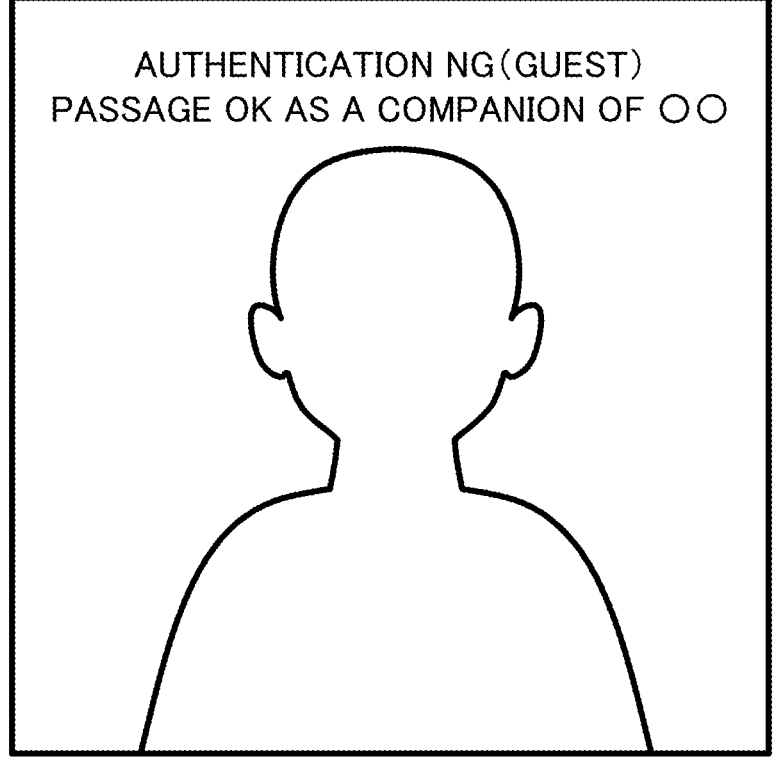
FIG. 16 is a conceptual diagram illustrating a display example of a silhouette image of a second user.

Next, with reference to FIG. 14 to FIG. 16, specific display examples of the silhouette image will be described. FIG. 14 is a conceptual diagram illustrating an example of the silhouette image. FIG. 15 is a conceptual diagram illustrating a display example of the silhouette image of the first user. FIG. 16 is a conceptual diagram illustrating a display example of the silhouette image of the second user.

As illustrated in FIG. 14, the silhouette image may be displayed as an image indicating the outer edge of the user. The silhouette image may be an image in which the outer edge of the user is deformed.

As illustrated in FIG. 15, when the silhouette image of the first user is displayed, various types of information about the first user may be superimposed on the silhouette image. In the illustration, a message of "Authentication OK (registered user)" indicating that image authentication is successful, is displayed in an upper part of the silhouette image. In a lower right part of the silhouette image, information about a "name", the "attribute information" and the "allowable number of people" of the first user is displayed.

As illustrated in FIG. 16, when the silhouette image of the second user is displayed, various types of information about the second user may be superimposed on the silhouette image. In the illustration, a message of "Authentication NG (guest)" indicating that the image authentication is failed, is displayed in the upper part of the silhouette image. In addition, a message of "Passage OK as an accompanying person of OO" is displayed. This indicates that the second user is permitted as the accompanying person of the first user and is permitted to pass through the specific area.

(Technical Effect)

Next, a technical effect obtained by the entry/exit management system 10 according to the sixth example embodiment will be described.

As described in FIG. 12 to FIG. 16, in the entry/exit management system 10 according to the sixth example embodiment, the silhouette image generated from the depth information is outputted. In this way, it is possible to perform the display that takes into account the user's personal information. For example, it is possible to deal with the user's opinions, such as not wanting the user's face to be displayed, or not wanting the others to see the user's face on a screen. Furthermore, since the silhouette image according to this example embodiment is generated on the basis of the depth information, it is possible to reduce a processing burden of the system, as compared to the case where the silhouette image is generated by another method (e.g., image analysis, etc.).

Seventh Example Embodiment

The entry/exit management system 10 according to a seventh example embodiment will be described with reference to FIG. 17 and FIG. 21. The seventh example embodiment is partially different from the sixth example embodiment only in the configuration and operation, and may be the same as the first to sixth example embodiments in the other parts. For this reason, a description of a part that overlaps the example embodiments described above will be omitted below.

(Functional Configuration)

First, with reference to FIG. 17, a functional configuration of the entry/exit management system 10 according to the seventh example embodiment will be described. FIG. 17 is a block diagram illustrating the functional configuration of the entry/exit management system according to the seventh example embodiment. In FIG. 17, the same components as those illustrated in FIG. 12 carry the same reference numerals.

Figure 17:
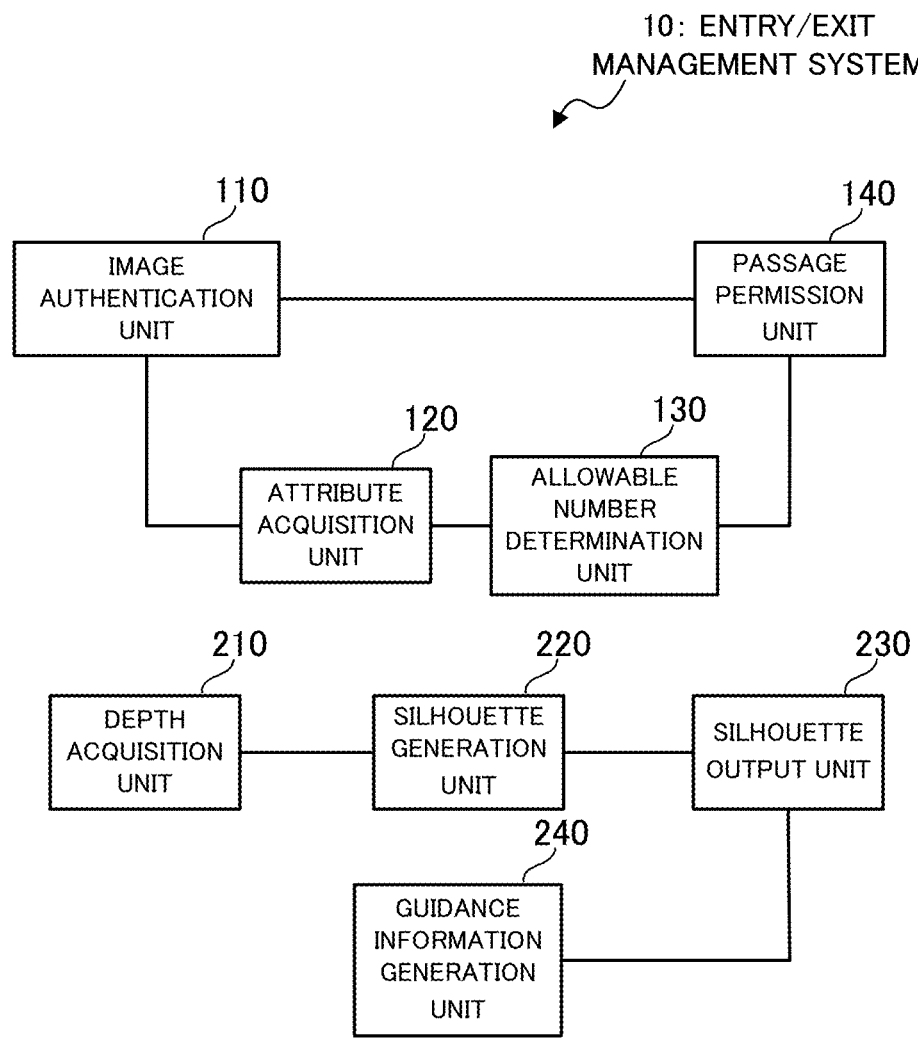
FIG. 17 is a block diagram illustrating a functional configuration of an entry/exit management system according to a seventh example embodiment.

As illustrated in FIG. 17, the entry/exit management system 10 according to the seventh example embodiment includes, as processing blocks for realizing the functions thereof, the image authentication unit 110, the attribute acquisition unit 120, the allowable number determination unit 130, the passage permission unit 140, the depth acquisition unit 210, the silhouette generation unit 220, the silhouette output unit 230, and a guidance information generation unit 240. That is, the entry/exit management system 10 according to the seventh example embodiment further includes the guidance information generation unit 240, in addition to the configuration in the sixth example embodiment (see FIG. 12). The guidance information generation unit 240 may be realized or implemented in the processor 11, for example.

The guidance information generation unit 240 is configured to generate guidance information for guiding the user. The guidance information may be generated, for example, as information for encouraging the user to change a standing position or posture. In this instance, the guidance information generation unit 240 may generate the guidance information on the basis of the image of the user (i.e., how the user looks in the image). The guidance information generation unit 240, may stop the generation of the guidance information when the guidance for the user is completed. In addition, when it is necessary to perform guidance that is different from before due to the movement of the user or the like, the guidance information generation unit 240 may generate new guidance information. The guidance information generated by the guidance information generation unit 230 is configured to be outputted to the silhouette output unit 230. The silhouette output unit 230 outputs the guidance information generated by the guidance information generation unit 240, together with the silhouette image generated by the silhouette generation unit 220.

<Flow of Operation>

Figure 18:
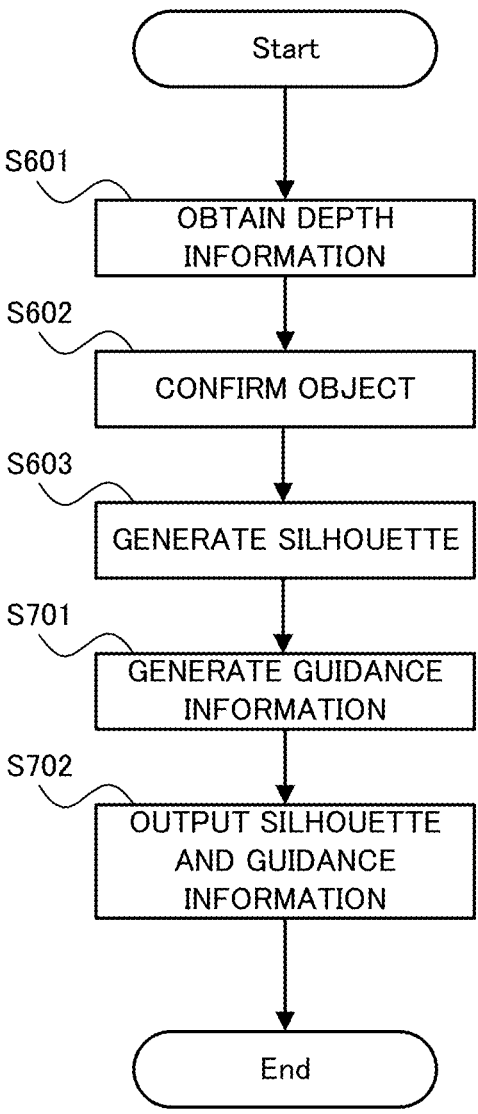
FIG. 18 is a flowchart illustrating a flow of operation related to the silhouette image of the entry/exit management system according to the seventh example embodiment.

Next, with reference to FIG. 18, a flow of operation related to the silhouette image in the entry/exit management system 10 according to the seventh example embodiment will be described. FIG. 18 is a flowchart illustrating the flow of the operations related to the silhouette image of the entry/exit management system according to the seventh example embodiment. In FIG. 18, the same steps as those illustrated in FIG. 13 carry the same reference numerals.

As illustrated in FIG. 18, when the entry/exit management system 10 according to the seventh example embodiment outputs the silhouette image, first, the depth acquisition unit 210 obtains the depth information (step S601). The depth information obtained by the depth acquisition unit 210 is outputted to the silhouette generation unit 220.

Subsequently, the silhouette generation unit 220 confirms a position or a shape of an object (in this case, the user) from the depth information (step S602). Then, the silhouette generation unit 220 generates the silhouette image of the confirmed object (step S603).

Especially in the seventh example embodiment, the guidance information generation unit 240 generates the guidance information for the user (step S701). The guidance information generated by the guidance information generator 240 is outputted by the silhouette output unit 230, together with the silhouette image generated by the silhouette generator 220 (step S702).

Display Examples of Guidance Information

Figure 19:
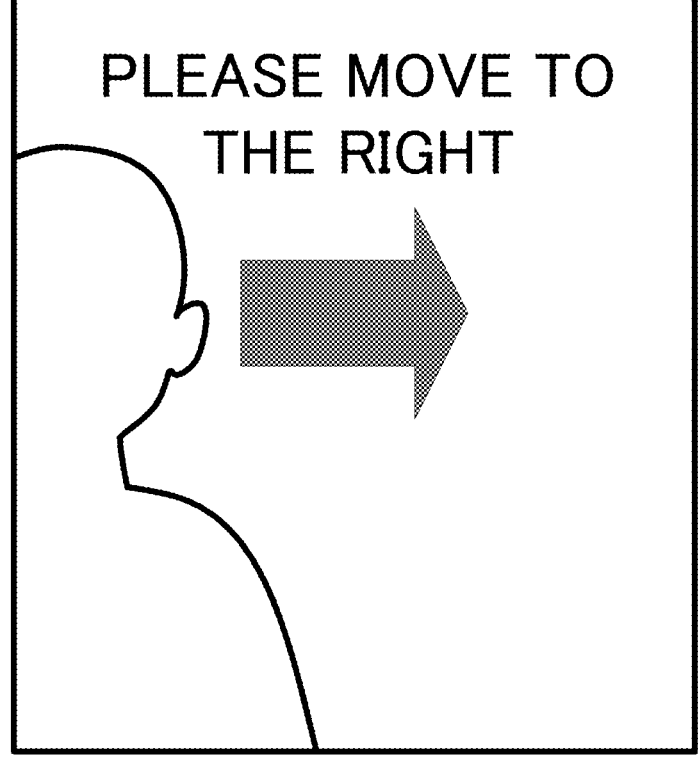
FIG. 19 is version 1 of a conceptual diagram illustrating an example of a silhouette image on which guidance information is superimposed.
Figure 20:
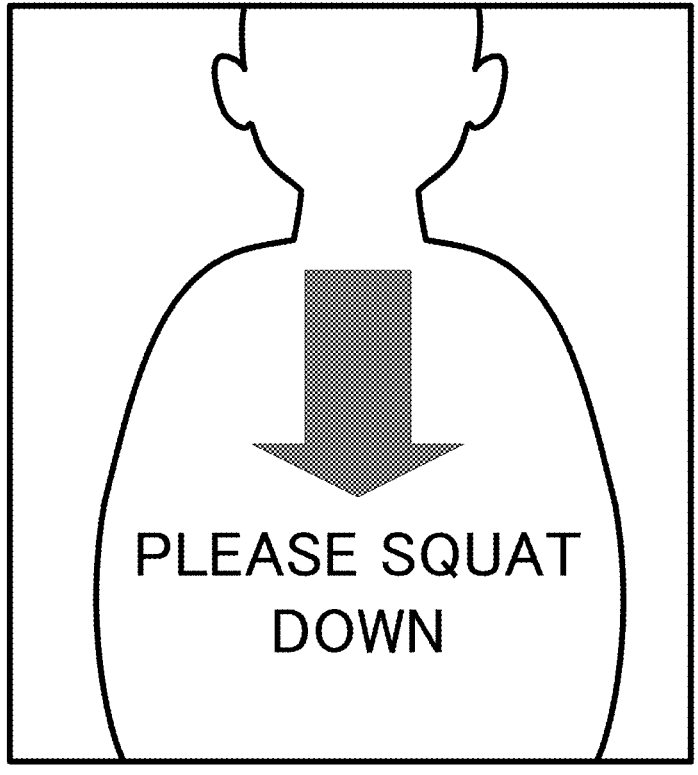
FIG. 20 is version 2 of a conceptual diagram illustrating an example of the silhouette image on which the guidance information is superimposed.

Next, with reference to FIG. 19 to FIG. 21, specific display examples of the guidance information will be described. FIG. 19 is version 1 of a conceptual diagram illustrating an example of the silhouette image on which the guidance information is superimposed. FIG. 20 is version 2 of a conceptual diagram illustrating an example of the silhouette image on which the guidance information is superimposed. FIG. 21 is version 3 of a conceptual diagram illustrating an example of the silhouette image on which the guidance information is superimposed.

As illustrated in FIG. 19, when the user is too close to a left side of the image (the user's face is partially not visible), a message of "Please move to the right." may be displayed as the guidance information, together with the silhouette image of the user. Furthermore, an arrow pointing to the right may be displayed as the guidance information.

As illustrated in FIG. 20, when the user is too close to an upper side of the image, and a message of "Please squat down." may be displayed as the guidance information, together with the silhouette image of the user. Furthermore, an arrow pointing downward may be displayed as the guidance information.

Figure 21:
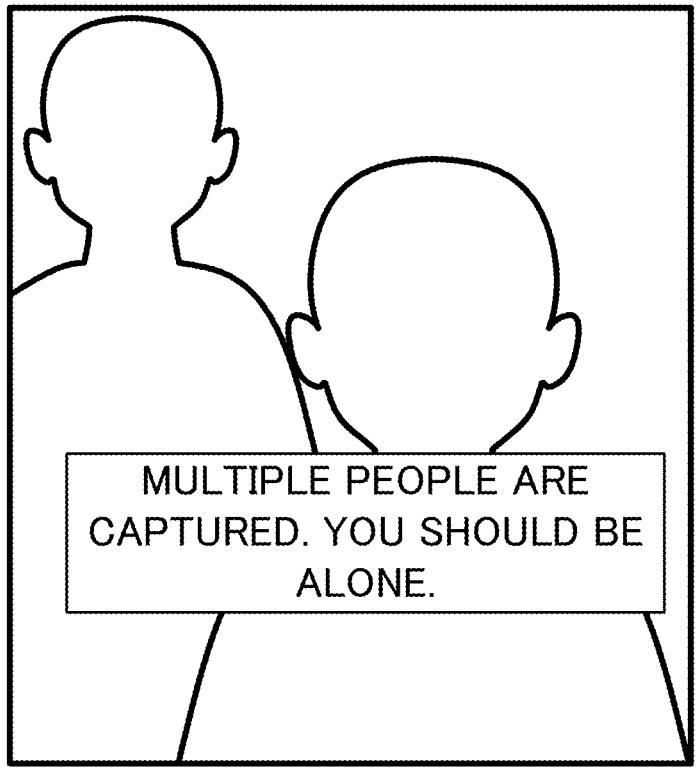
FIG. 21 is version 3 of a conceptual diagram illustrating an example of the silhouette image on which the guidance information is superimposed.

As illustrated in FIG. 21, when a plurality of users are captured, a message of "Multiple people are captured. You should be alone." may be displayed as the guidance information. In this case, the depth information may be used to identify the nearest user as an imaging target, and the guidance information may be outputted to encourage the other users to move out of an imaging range. The guidance information may be outputted in accordance with a distance between the plurality of users. For example, when the distance between the plurality of users becomes closer than a predetermined distance, the guidance information for encouraging the users to keep a little more distance from each other may be outputted.

The guidance information may be displayed including a specific numerical value such that the user knows specifically how far to move. For example, a message of "Please move to the right by 50 more cm." or the like may be displayed. In this case, the numerical value may be changed in real time as the user moves. The guidance may be displayed as a "frame (an enclosed area)" indicating a place to which the user should move, such that the user knows where to move. The guidance information may also be displayed in conspicuous colors, such that the user can easily recognize it. Alternatively, the guidance information may be displayed in an aspect with a highlighting effect, such as blinking. Furthermore, in addition to the guidance information superimposed and displayed on the silhouette image, for example, the guidance information may be outputted by audio or the like.

The guidance information may be used to perform guidance for properly performing the image authentication in the image authentication unit 110, for example. For example, it may be the guidance information for guiding the user to a position suitable for the image authentication. Furthermore, it may be the guidance information for encouraging the users to keep a distance from each other when the image authentication cannot be normally performed due to the overlapping of the users. In addition, the guidance information may be used to perform guidance for properly performing a process performed by an authentication unit other than the image authentication unit 110. For example, it may be the guidance information for making a normal determination when biometric determination (spoofing determination) is performed by using images. Such guidance information may be generated on the basis of a result of an actually performed determination process. For example, when the spoofing determination cannot be normally performed, the guidance information for encouraging the user to move, or the like, may be generated.

(Technical Effect)

Next, a technical effect obtained by the entry/exit management system 10 according to the seventh example embodiment will be described.

As described in FIG. 17 to FIG. 21, in the entry/exit management system 10 according to the seventh example embodiment, the guidance information for guiding the user is outputted together with the silhouette image. In this way, it is possible to guide the user more easily, by using the silhouette image. As a consequence, it is possible to properly capture the image used for the image authentication and the detection of the user, or the like for example.

Eighth Example Embodiment

The entry/exit management system 10 according to an eighth example embodiment will be described with reference to FIG. 22 to FIG. 26. The entry/exit management system 10 according to the eighth example embodiment is partially different from those of the first to seventh example embodiments in the configuration and operation, may be the same as those of the first to seventh example embodiments in the other parts. For this reason, a description of a part that overlaps the example embodiments described above will be omitted below.

(Functional Configuration)

Figure 22:
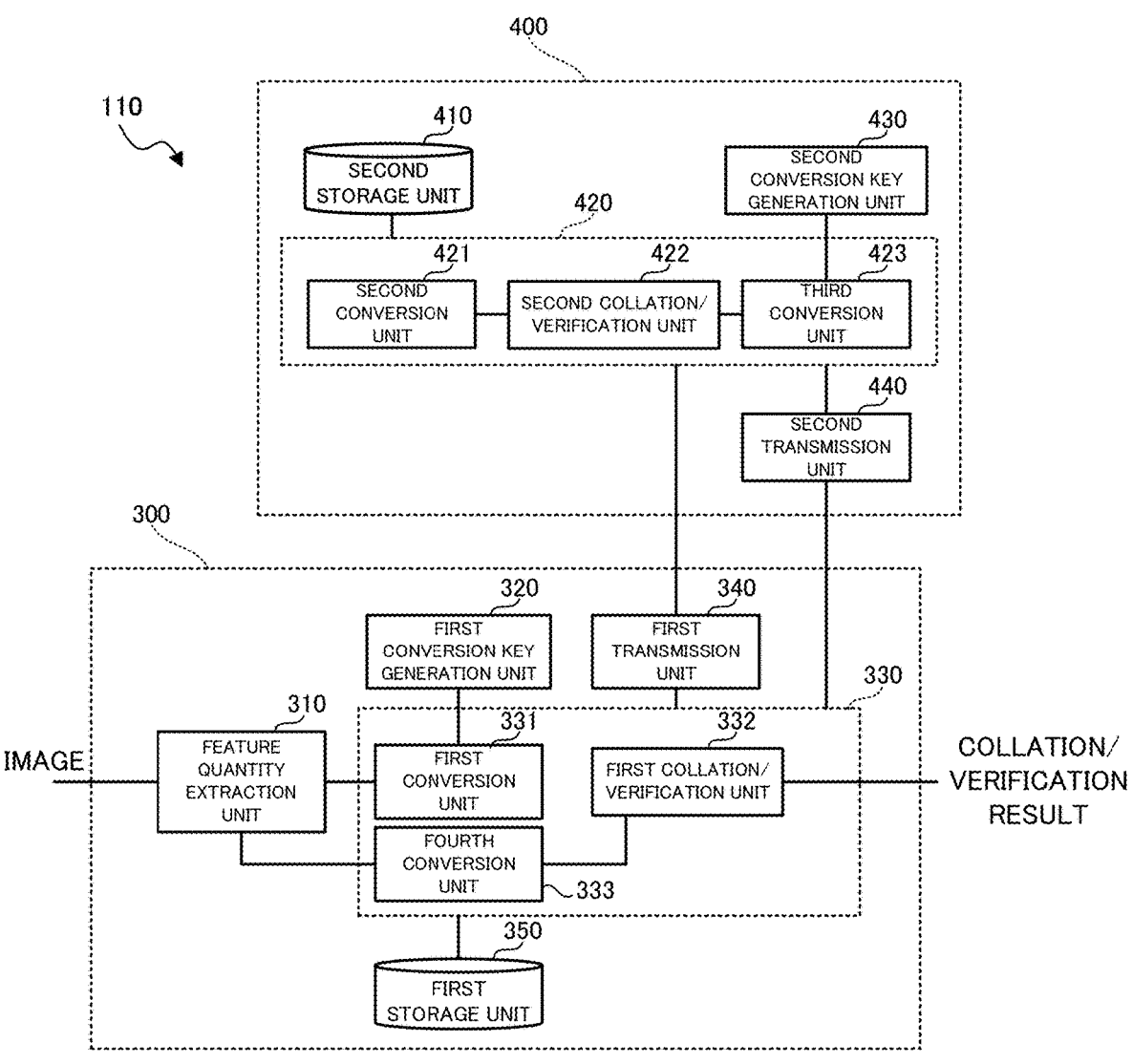
FIG. 22 is a block diagram illustrating a functional configuration of an image authentication unit in an entry/exit management system according to an eighth example embodiment.

First, with reference to FIG. 22, a functional configuration of the entry/exit management system 10 according to the eighth example embodiment (especially, the configuration of the image authentication unit 110) will be described. FIG. 22 is a block diagram illustrating the functional configuration of the image authentication unit in the entry/exit management system according to the eighth example embodiment. In FIG. 22, the same components as those illustrated in FIG. 2 carry the same reference numerals.

As illustrated in FIG. 22, the image authentication unit 110 according to the eighth example embodiment includes a first authentication apparatus 300 and a second authentication apparatus 400. Although one first authentication apparatus 300 and one second authentication apparatus 400 are illustrated here, the first authentication apparatus 300 may be connected to a plurality of second authentication apparatuses. The following exemplifies that the first authentication apparatus 300 and the second authentication apparatus 400 are authentication apparatuses that are applied to a walk-through gate in entry/exit at a building occupied by a plurality of companies (tenants). In this example, the first authentication apparatus 300 is configured as an edge terminal for performing an entry/exit process, and the second authentication apparatus 400 may be configured as a server of each tenant.

The first authentication apparatus 300 includes, as processing blocks for realizing the functions thereof, a feature quantity extraction unit 310, a first conversion key generation unit 320, a first processing unit 330, a first transmission unit 340, and a first storage unit 350. The first processing unit 330 is a component for performing a main process in the first authentication apparatus 300 (specifically, a conversion process or a collation/verification process), and includes a first conversion unit 331, a first collation/verification unit 332, and a fourth conversion unit 333.

The feature quantity extraction unit 310 is configured to extract the feature quantity from an image inputted to the first authentication apparatus 300 (i.e., an image of the user who intends to pass through the gate). A detailed description of a method of extracting the feature quantity from the image will be omitted here, because the existing techniques/technologies can be properly adopted. The feature quantity extracted by the feature quantity extraction unit 310 is configured to be outputted to the first conversion unit 331.

The first conversion key generation unit 320 is configured to generate a first conversion key for converting (encrypting) the feature quantity extracted by the feature quantity extraction unit 310. The first conversion key may be generated as a one-time key. The first conversion key generated by the first conversion key generation unit 320 is configured to be outputted to the first conversion unit 331.

The first conversion unit 331 is configured to convert the feature quantity extracted by the feature quantity extraction unit 310, by using the first conversion key generated by the first conversion key generation unit 320, and to generate first conversion information. A detailed description of a method of converting the feature quantity by using the conversion key will be omitted here, because the existing techniques/technologies can be properly adopted. The first conversion information generated by the first conversion unit 331 is configured to be outputted to the first transmission unit 340, together with the first conversion key.

The first collation/verification unit 332 is configured to collate/verify fourth conversion information described later (information converted by the fourth conversion unit 333) with third conversion information (information generated by a third conversion unit 423) stored in the first storage unit 350. The first collation/verification unit 332 is configured to output a result of collation/verification of the fourth conversion information with the third conversion information. The collation/verification result may be outputted to the passage permission unit 140 described above (see FIG. 2).

The fourth conversion unit 333 is configured to convert the feature quantity extracted by the feature quantity extraction unit 310, by using a second conversion key (described in detail later) stored in the first storage unit 350, and to generate the fourth conversion information. The fourth conversion information generated by the fourth conversion unit 333 is configured to be outputted to the first collation/verification unit 322.

The first transmission unit 340 is configured to transmit the first conversion key generated by the first conversion key generation unit 320 and the first conversion information generated by the first conversion unit 331, to the second authentication apparatus 400. The first transmission unit 340 may transmit the first conversion key and the first conversion information to the second authentication apparatus 400, when the collation/verification of the fourth conversion information with the third conversion information in the first verification unit 332 is failed.

The first storage unit 350 is configured to store a second conversion key transmitted from the second authentication apparatus 400 (a conversion key generated by a second conversion key generation unit 430 described later) and the third conversion information (the information generated by the third conversion unit 423 described later). The second conversion key and the third conversion information stored in the first storage unit 350 are readable, as appropriate, by the first collation/verification unit 332 and the fourth conversion unit 333.

The second authentication apparatus 400 includes, as processing blocks for realizing the functions thereof, a second storage unit 410, a second processing unit 420, a second conversion key generation unit 430, and a second transmission unit 440. The second processing unit 420 is a component for performing a main process in the second authentication apparatus 400 (specifically, a conversion process or a collation/verification process), and includes a second conversion unit 421, a second collation/verification unit 422, and a third conversion unit 423.

The second storage unit 410 is configured to store the feature quantity of a registered user of each tenant (hereinafter referred to as a "registered feature quantity" as appropriate). The registered feature quantity stored in the second storage unit 410 is readable, as appropriate, by the second conversion unit 421 and the third conversion unit 423.

The second conversion unit 421 is configured to convert the registered feature quantity stored in the second storage unit 410, by using the first conversion key transmitted from the first authentication apparatus 300 (i.e., the conversion key generated by the first conversion key generation unit 320), and to generate second conversion information. The second conversion information generated by the second conversion unit 421 is configured to be outputted to the second collation/verification unit 422.

The second collation/verification unit 422 is configured to collate/verify the first conversion information transmitted from the first authentication apparatus 300 (i.e., the information generated by the first conversion unit 321) with the second conversion information generated by the second conversion unit 421. An output result in the second collation/verification unit 422 is configured to be outputted to the first authentication apparatus 300, through the second transmission unit 440.

The third conversion unit 423 is configured to convert the registered feature quantity stored in the second storage unit 420, by using the second conversion key generated by the second conversion key generation unit 430, and to generate the third conversion information. The third conversion information generated by the third conversion unit 423 is configured to be outputted to the second transmission unit 440, together with the second conversion key.

The second conversion key generation unit 430 is configured to generate the second conversion key for converting the registered feature quantity stored in the second storage unit 420. The second conversion key may be generated as a one-time key. The second conversion key generation unit 430 may be configured to generate the second conversion key, when the collation/verification of the first conversion information with the second conversion information in the second verification unit 422 is successful. The second conversion key generated by the second conversion key generation unit 430 is configured to be outputted to the third conversion unit 423.

The second transmission unit 440 is configured to transmit the second conversion key generated by the second conversion key generation unit 420 and the third conversion information generated by the third conversion unit 423, to the first authentication apparatus 300. The second conversion key and the third conversion key transmitted by the second transmission unit 440 are stored in the first storage unit 350 in the first authentication apparatus 300, as described above.

(Flow of Operation)

Figure 23:
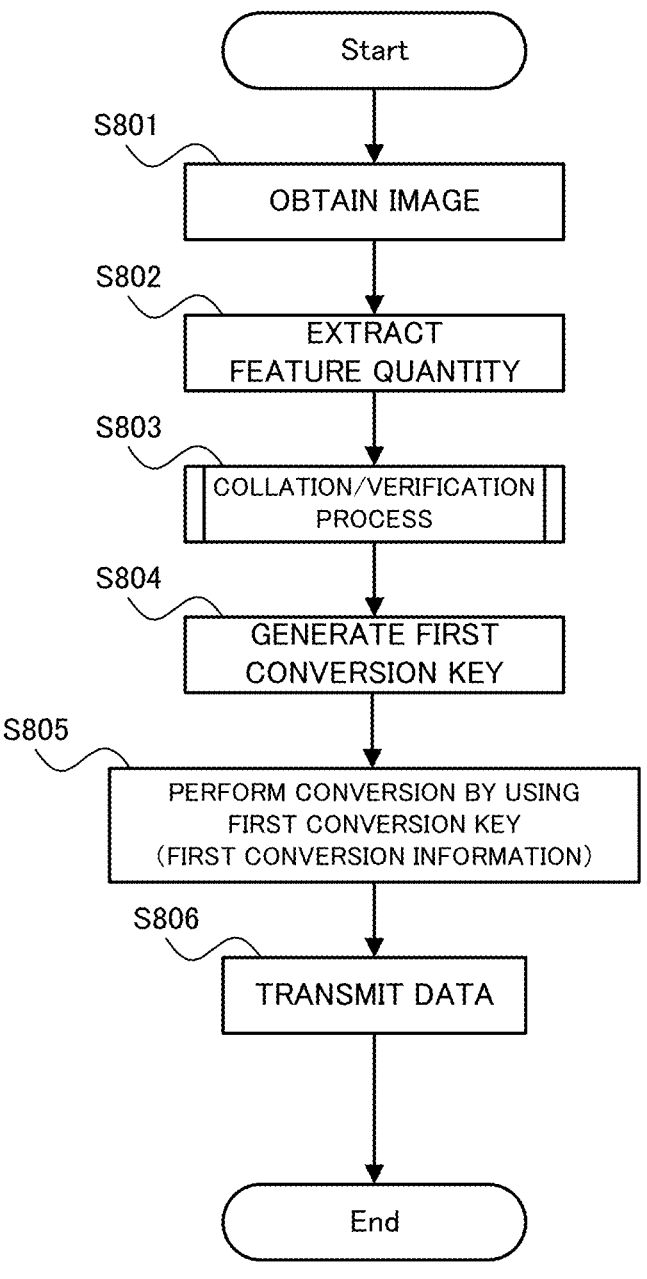
FIG. 23 is version 1 of a flowchart illustrating a flow of operation of a first authentication apparatus according to the eighth example embodiment.
Figure 24:
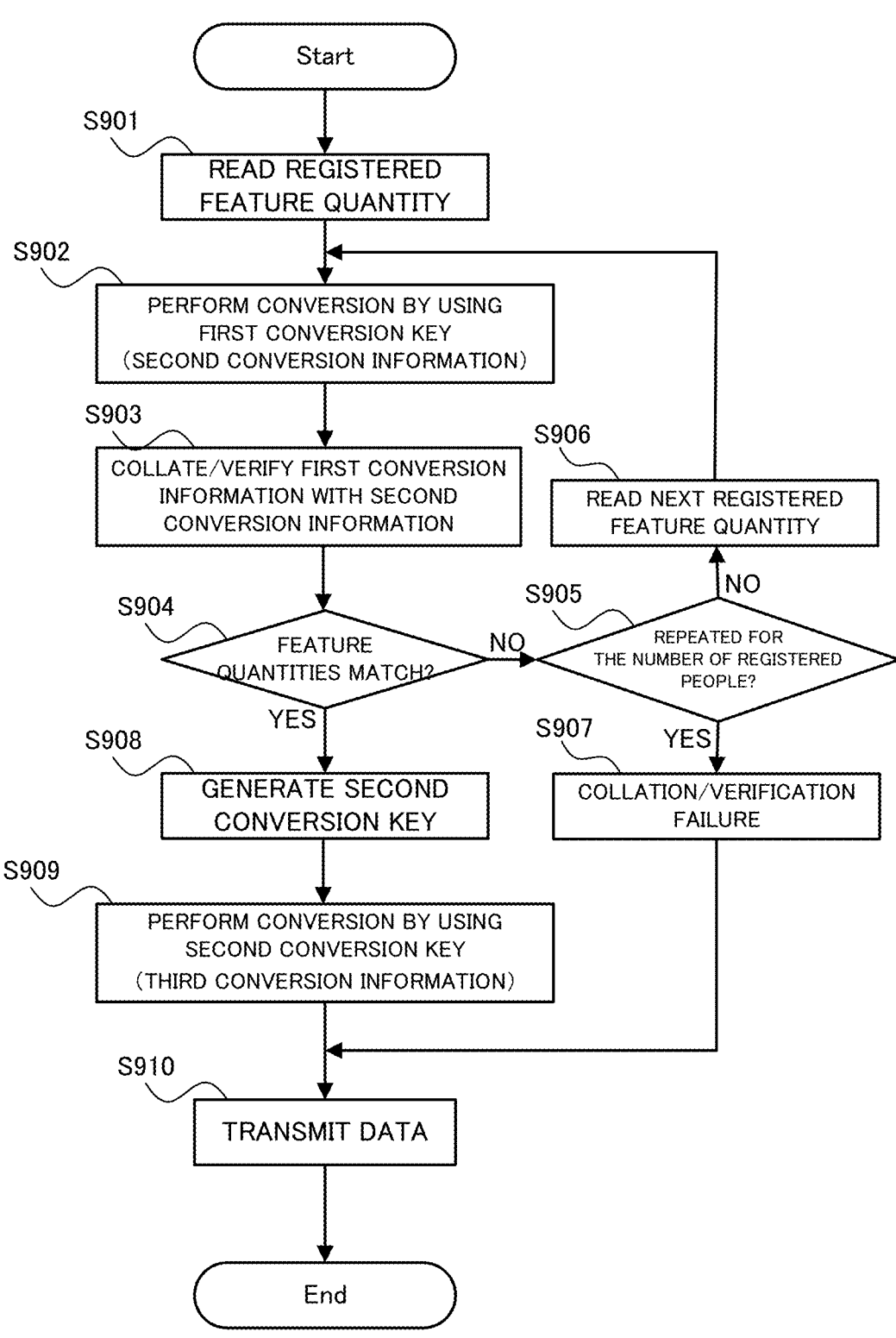
FIG. 24 is a flowchart illustrating a flow of operation of a second authentication apparatus according to the eighth example embodiment.
Figure 25:
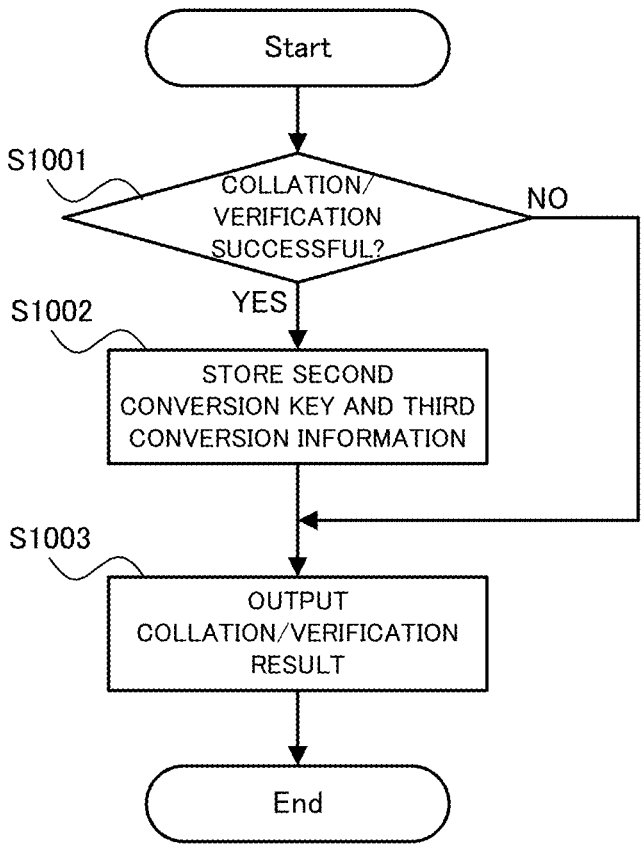
FIG. 25 is version 2 of a flowchart illustrating a flow of the operation of the first authentication apparatus according to the eighth example embodiment.
Figure 26:
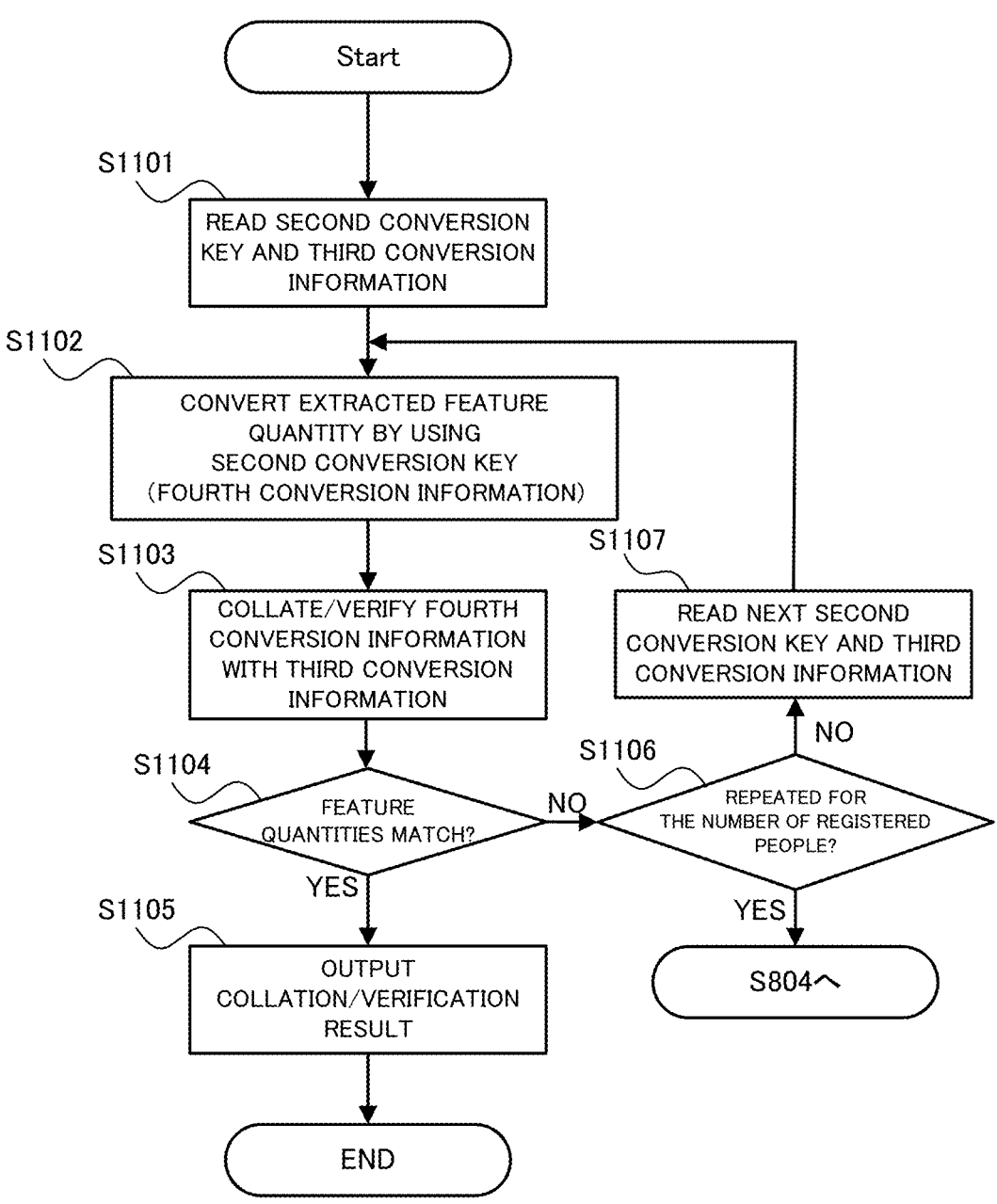
FIG. 26 is a flowchart illustrating a flow of a collation/verification process by the first authentication apparatus according to the eighth example embodiment.

Next, with reference to FIG. 23 to FIG. 26, operation of the image authentication unit 110 according to the eighth example embodiment (specifically, the first authentication apparatus 300 and the second authentication apparatus 400) will be described. FIG. 23 is version 1 of a flowchart illustrating a flow of the operation of the first authentication apparatus according to the eighth example embodiment. FIG. 24 is a flowchart illustrating a flow of the operation of the second authentication apparatus according to the eighth example embodiment. FIG. 25 is version 2 of a flowchart illustrating a flow of the operation of the first authentication apparatus according to the eighth example embodiment. FIG. 26 is a flowchart illustrating a flow of a collation/verification process by the first authentication apparatus according to the eighth example embodiment.

(Operation of First Authentication Apparatus)

As illustrated in FIG. 23, in operation of the first authentication apparatus 300, first, the image of the user is obtained (step S801). Then, the feature quantity extraction unit 310 extracts the feature quantity from the image of the user (step S802).

Subsequently, a collation/verification process in the first processing unit 330 (specifically, a conversion process by the fourth conversion unit 333 and a collation/verification process by the first collation/verification unit 332) is performed by using the extracted feature quantities (step S803). The collation/verification process will be described in detail later (see FIG. 26).

After the collation/verification process (or, more precisely, when the collation/verification process is failed), the first conversion key generation unit 320 generates the first conversion key (step S804). Then, the first conversion unit 331 converts the extracted feature quantity, by using the first conversion key, and generates the first conversion information (step S805).

Subsequently, the first transmission unit 340 transmits the first conversion key generated by the first conversion key generation unit 320 and the first conversion information generated by the first conversion unit 331, to the second authentication apparatus 400 (step S806).

(Operation of Second Authentication Apparatus)

As illustrated in FIG. 24, when the first conversion key and the first conversion information are transmitted to the second authentication apparatus 400, the second conversion unit 421 reads the registered feature quantity from the second storage unit 410 (step S901). The second conversion unit 421 converts the registered feature quantity read from the second storage unit, by using the first conversion key, and generates the second conversion information (step S902).

Subsequently, the second collation/verification unit 422 collates/verifies the first conversion information transmitted from the first authentication apparatus with the second conversion information generated by the second conversion unit 421 (step S903). As a result of the collation/verification by the second collation/verification unit 422, when it is determined that the feature quantities do not match (step S904: NO), the second collation/verification unit 422 determines whether or not the collation/verification is repeated for the number of registered people (i.e., for the number of people registered in the second storage unit 410) (step S905). When it is determined that the collation/verification is not repeated for the number of registered people (step S905: NO), the second conversion unit 421 reads the next registered feature quantity (step S906), and the process is repeated from the step S902 again. On the other hand, when it is determined that the collation/verification is repeated for the number of registered people (step S905: YES), the second verification unit 422 outputs a collation/verification result of a verification failure (step S907). Then, the second transmission unit 440 transmits the collation/verification result to the first authentication apparatus 300 (step S910).

On the other hand, as a result of the collation/verification by the second collation unit 422, when it is determined that the feature quantities match (step S904: YES), the second conversion key generation unit 430 generates the second conversion key (step S908). Then, the third conversion unit 423 converts the feature quantity read from the second storage unit (specifically, the feature quantity that is successfully collated/verified), by using the second conversion key, and generates the third conversion information (step S909). Then, the second transmission unit 440 transmits the second conversion key and the third conversion information, to the first authentication apparatus 300 (step S910).

(Result Output Operation)

As illustrated in FIG. 25, when the collation/verification result (i.e., the result of the collation/verification by the second verification unit 422) is transmitted to the first authentication apparatus 300 from the second authentication apparatus 400, the first processing unit 330 determines whether or not the transmitted collation/verification result is a success (step S1001). When the collation/verification result is a success (step S1001: YES), the first processing unit 330 stores the second conversion key and the third conversion information in the first storage unit 350 (step S1002). On the other hand, when the collation/verification result is a failure (step S1001: NO), the step S1002 is omitted. Finally, the first processing unit 330 outputs the collation/verification result (step S1003).

(Collation/Verification Process of First Authentication Apparatus)

As illustrated in FIG. 26, when the step S803 in FIG. 23 is started, first, the first processing unit 330 reads the second conversion key and the third conversion information (i.e., the information transmitted from the second authentication apparatus 400) from the first storage unit 350 (step S1101). Then, the fourth conversion unit 333 converts the feature quantity extracted by the feature quantity extraction unit 310, by using the second conversion key, and generates the fourth conversion information (step S1102).

Subsequently, the first collation/verification unit 422 collates/verifies the fourth conversion information generated by the fourth conversion unit 333 with the third conversion information read from the first storage unit 350 (step S1103). As a result of the collation/verification by the first verification unit 332, when it is determined that the feature quantities match (step S1104: YES), the first verification unit 332 outputs the collation/verification result is a success (step S1105).

On the other hand, as a result of the collation/verification by the first collation unit 332, when it is determined that the feature quantities do not match (Step S1104: NO), the first collation unit 332 determines whether or not the collation/verification is repeated for the number of registered people (i.e., for the number of people registered in the first storage unit 350) (step S1106). Then, when it is determined that the collation/verification is not repeated for the number of registered people (step S1106: NO), the first processing unit 330 reads the next second conversion key and third conversion information (step S1107), and the process is repeated from the step S1102 again. On the other hand, when it is determined that the collation/verification is repeated for the number of registered people (step S1106: YES), the first collation/verification unit 332 determines that the collation/ verification result is a failure, and the step S804 in FIG. 22 is started.

In a series of the processing steps described in FIG. 23 to FIG. 26, throughput increases as the number of collation/ verification targets (i.e., the registered users) increases. Therefore, when many second authentication apparatuses 400 are connected to the first authentication apparatus 300 (e.g., when there are many tenants), a processing load of the authentication process is large. In order to prevent such an increase in the processing load, for example, the collation/ verification targets may be narrowed down. For example, the collation/verification targets may be narrowed down in accordance with a time zone or a period of time, and the collation/verification process may be performed preferentially from the narrowed collation/verification targets. In this instance, the collation/verification targets may be narrowed down in accordance with a clock-in time or the like at the tenants in which the second authentication apparatus 400 is installed, or the like, for example. For example, if a clock-in time at Company A is 9:30 and a clock-in time at Company B is 10:00, the collation/verification targets may be narrowed down to employees of Company A for a time zone of 9:00 to 10:00, and the collation/verification targets may be narrowed down to employees of Company B for a time zone of 10:00 to 11:00.

(Technical Effect)

Next, a technical effect obtained by the entry/exit management system 10 according to the eighth example embodiment will be described.

As described in FIG. 22 to FIG. 26, in the entry/exit management system 10 according to the eighth example embodiment, the generation of the conversion key and the collation/verification process using the conversion information generated by using the conversion key are performed in each of the first authentication apparatus 300 and the second authentication apparatus 400. In this way, the information transmitted to each tenant (i.e., the second authentication apparatus 400) is information obtained by converting biometric information about the user (the feature quantity) by using the first conversion key (information converted in one direction), and thus, even if the authentication of the same person is inquired at different dates and times, the tenants cannot identify that inquired people are the same person. This protects privacy among the tenants.

Furthermore, the edge terminal (i.e., the first authentication apparatus 300) stores the second conversion key and the third conversion information converted by using the second conversion key, but does not store personal information, such as name and workplace, and it is thus possible to reduce the risk of leakage of the personal information. Furthermore, since the second conversion key and the third conversion information stored in the edge terminal are not the biometric information about the user, even if they are leaked, it is not the leakage of the biometric information. There is such a risk that the conversion information is linked to the biometric information about a specific person, by associating the conversion information with the conversion key used to obtain the conversion information; however, even if the conversion information and the conversion key are leaked, the feature quantity of the person in question is not converted by the conversion key in the authentication process, by prohibiting the reuse of the conversion key, and the leaked information is no longer the personal information.

In addition, it is possible to share the conversion key stored in the edge terminal by setting the conversion key generated by each tenant (i.e., the second conversion key) as a common conversion key with an expiration date of 1 day to 1 month, and it is possible to speed up the processing of the edge terminal. In this case, although security is reduced as compared with the case where the conversion key is a one-time key, it is still possible to maintain the privacy protection among the tenants described above, and the security when the information in the edge terminal is leaked.

The above example embodiment describes an example of the walk-through gate, but each of the authentication apparatuses is not limited to such a form, and may be applied to a door or the like, for example. Furthermore, each of the authentication apparatuses described in the example embodiment may be applied to various systems that perform biometric authentication in a multi-tenant manner. The above example embodiment exemplifies that the feature quantity is extracted and collated/verified in the edge terminal, and that the collation/verification is also performed in each tenant; however, the configuration of the edge terminal and the tenant may be changed in accordance with a use case, as appropriate.

A processing method in which a program for operating the configuration in each of the example embodiments to realize the functions of each example embodiment is recorded on a recording medium, and in which the program recorded on the recording medium is read as a code and executed on a computer, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and executes processing alone, but also the program that operates on an OS and executes processing in cooperation with the functions of expansion boards and another software, is also included in the scope of each of the example embodiments.

This disclosure is not limited to the examples described above and is allowed to be changed, if desired, without departing from the essence or spirit of this disclosure which can be read from the claims and the entire specification. An entry/exit management system, an entry/exit management method, a computer program, and a recording medium with such changes are also intended to be within the technical scope of this disclosure.

Supplementary Notes

The example embodiments described above may be further described as, but not limited to, the following Supplementary Notes.

(Supplementary Note 1)

An entry/exit management system according to Supplementary Note 1 is an entry/exit management system including: an authentication unit that performs image authentication of a user who passes through a specific area; an attribute acquisition unit that obtains attribute information about a first user when there are the first user who has succeeded in the image authentication and a second user who has failed in the image authentication; a determination unit that determines an allowable number of people who can accompany the first user, on the basis of the attribute information; and a permission unit that permits the second user to pass through the specific area together with the first user, when the number of the second users is less than or equal to the allowable number of people.

(Supplementary Note 2)

An entry/exit management system according to Supplementary Note 2 is the entry/exit management system according to Supplementary Note 1, wherein the permission unit presents an image of the second user to the first user when the number of the second users is less than or equal to the allowable number of people, and permits the second user to pass through the specific area, when the first user permits the second user included in the image as an accompanying person.

(Supplementary Note 3)

An entry/exit management system according to Supplementary Note 3 is the entry/exit management system according to Supplementary Note 1 or 2, further including a relationship determination unit that determines whether or not there is a relationship between the first user and the second user, wherein the permission unit permits the second user to pass through the specific area, when there is a relationship between the first user and the second user.

(Supplementary Note 4)

An entry/exit management system according to Supplementary Note 4 is the entry/exit management system according to any one of Supplementary Notes 1 to 3, further including a change unit that changes the allowable number of people of the first user, on the basis of an input from the first user.

(Supplementary Note 5)

An entry/exit management system according to Supplementary Note 5 is the entry/exit management system according to any one of Supplementary Notes 1 to 4, wherein the determination unit calculates a total allowable number of people by summing up the allowable number of people that is determined for each of a plurality of first users, when there are the plurality of the first users, and the permission unit permits the second user to pass through the specific area, when the number of the second users is less than or equal to the total allowable number of people.

(Supplementary Note 6)

An entry/exit management system according to Supplementary Note 6 is the entry/exit management system according to any one of Supplementary Notes 1 to 5, further including: a depth acquisition unit that obtains depth information about the user; a silhouette generation unit that generates a silhouette image of the user on the basis of the depth information; and a silhouette output unit that outputs the silhouette image.

(Supplementary Note 7)

An entry/exit management system according to Supplementary Note 7 is the entry/exit management system according to Supplementary Note 6, further including a guidance information generation unit that generates guidance information for guiding the user, wherein the silhouette output unit outputs the guidance information together with the silhouette image.

(Supplementary Note 8)

An entry/exit management system according to Supplementary Note 8 is the entry/exit management system according to any one of Supplementary Notes 1 to 7, wherein the authentication unit includes a first authentication apparatus and a second authentication apparatus that are configured to communicate with each other, the first authentication apparatus includes: an extraction unit that extracts a feature quantity from an image of the user; a first conversion key generation unit that generates a first conversion key; a first conversion unit that converts the extracted feature quantity by using the first conversion key and generates first conversion information; and a first transmission unit that transmits the first conversion key and the first conversion information, to the second authentication apparatus, the second authentication apparatus includes: a second storage unit that stores a registered feature quantity that is a feature quantity of a registered user; a second conversion unit that converts the registered feature quantity by using the first conversion key and generates second conversion information; a second collation/verification unit that collates/verifies the first conversion information with the second conversion information; a second conversion key generation unit that generates a second conversion key when collation/verification by the second verification unit is successful; a third conversion unit that converts the registered feature quantity by using the second conversion key and generates third conversion information; and a second transmission unit that transmits the second conversion key and the third conversion information, to the first authentication apparatus, and the first authentication apparatus further includes: a first storage unit that stores the second conversion key and the third conversion information; a fourth conversion unit that converts a newly extracted feature quantity by using the second conversion key and generates fourth conversion information; and a first collation/verification unit that collates/verifies the fourth conversion information with the third conversion information.

(Supplementary Note 9)

An entry/exit management method according to Supplementary Note 9 is an entry/exit management method including: performing image authentication of a user who passes through a specific area; obtaining attribute information about a first user when there are the first user who has succeeded in the image authentication and a second user who has failed in the image authentication; determining an allowable number of people who can accompany the first user, on the basis of the attribute information; and permitting the second user to pass through the specific area together with the first user, when the number of the second users is less than or equal to the allowable number of people.

(Supplementary Note 10)

A computer program according to Supplementary Note 10 is a computer program that operates a computer to: perform image authentication of a user who passes through a specific area; obtain attribute information about a first user when there are the first user who has succeeded in the image authentication and a second user who has failed in the image authentication; determine an allowable number of people who can accompany the first user, on the basis of the attribute information; and permit the second user to pass through the specific area together with the first user, when the number of the second users is less than or equal to the allowable number of people.

(Supplementary Note 11)

A recording medium according to Supplementary Note 11 is a recording medium on which the computer program described in Supplementary Note 10 is recorded.

To the extent permitted by law, this application claims priority based on Japanese application No. 2021-048491, filed Mar. 23, 2021, the entire disclosure of which is hereby incorporated by reference. Furthermore, to the extent permitted by law, all publications and papers described herein are incorporated herein by reference.

DESCRIPTION OF REFERENCE CODES

10 Entry/exit management system
11 Processor

20 Camera
110 The image authentication unit
120 Attribute acquisition unit
130 Allowable number determination unit
131 Number summing unit
140 Passage permission unit
141 Image transmission unit
142 Input reception unit
150 Relationship determination unit
160 Allowable number change unit
210 Depth acquisition unit
220 Silhouette generation unit
230 Silhouette output unit
240 Guidance information generation unit
300 First authentication apparatus
310 Feature quantity extraction unit
320 First conversion key generation unit
330 First processing unit
331 First conversion unit
332 First collation/verification unit
333 Fourth conversion unit
340 First transmission unit
350 First storage unit
400 Second authentication apparatus
410 Second storage unit
420 Second processing unit
421 Second conversion unit
422 Second collation/verification unit
423 Third conversion unit
430 Second conversion key generation unit
440 Second transmission unit

What is claimed is:

1. An entry/exit management system comprising:
at least one memory that is configured to store instructions; and
at least one processor that is configured to execute the instructions to:
    perform authentication of a user who passes through a specific area;
    acquire attribute information about a first user who has succeeded in the authentication determine an allowable number of people who can accompany the first user, on the basis of the attribute information;
    permit the second user to pass through the specific area together with the first user, when the number of the second users is less than or equal to the allowable number of people; and
    present an image of the second user to the first user when the number of the second users is less than or equal to the allowable number of people, and permit the second user to pass through the specific area, when the first user permits the second user included in the image as an accompanying person.

2. The entry/exit management system according to claim 1, wherein the at least one processor is configured to execute the instructions to:
    determine whether or not there is a relationship between the first user and the second user; and
    permit the second user to pass through the specific area, when there is a relationship between the first user and the second user.

3. The entry/exit management system according to claim 1, wherein the at least one processor is configured to execute the instructions to change the allowable number of people of the first user, on the basis of an input from the first user.

4. The entry/exit management system according to claim 1, wherein the at least one processor is configured to execute the instructions to:
    calculate a total allowable number of people by summing up the allowable number of people that is determined for each of a plurality of first users, when there are the plurality of the first users; and
    permit the second user to pass through the specific area, when the number of the second users is less than or equal to the total allowable number of people.

5. The entry/exit management system according to claim 1, wherein the at least one processor is configured to execute the instructions to:
    obtain depth information about the user;
    generate a silhouette image of the user on the basis of the depth information; and
    output the silhouette image.

6. The entry/exit management system according to claim 5, wherein the at least one processor is configured to execute the instructions to:
    generate guidance information for guiding the user; and
    output the guidance information together with the silhouette image.

7. The entry/exit management system according to claim 1, wherein the at least one processor is configured to execute the instructions to:
    extract a feature quantity from an image of the user;
    generate a first conversion key;
    convert the extracted feature quantity by using the first conversion key and generates first conversion information;
    transmit the first conversion key and the first conversion information;
    store a registered feature quantity that is a feature quantity of a registered user;
    convert the registered feature quantity by using the first conversion key and generates second conversion information;
    collate/verify the first conversion information with the second conversion information;
    generate a second conversion key when collation/verification is successful;
    convert the registered feature quantity by using the second conversion key and generates third conversion information;
    transmit the second conversion key and the third conversion information, to the first authentication apparatus, apparatus;
    store the second conversion key and the third conversion information;
    convert a newly extracted feature quantity by using the second conversion key and generates fourth conversion information; and
    collate/verify the fourth conversion information with the third conversion information.

8. An entry/exit management method comprising:
    performing authentication of a user who passes through a specific area;
    acquiring attribute information about a first user who has succeeded in the authentication;
    determining an allowable number of people who can accompany the first user, on the basis of the attribute information;
    permitting the second user to pass through the specific area together with the first user, when the number of the second users is less than or equal to the allowable number of people; and presenting an image of the second user to the first user when the number of the second users is less than or equal to the allowable number of people, and permit the second user to pass through the specific area, when the first user permits the second user included in the image as an accompanying person.

9. A non-transitory recording medium on which a computer program that allows a computer to execute an entry/exit management method is recorded, the entry/exit management method comprising: performing authentication of a user who passes through a specific area;

acquiring attribute information about a first user who has succeeded in the authentication;

determining an allowable number of people who can accompany the first user, on the basis of the attribute information;

permitting the second user to pass through the specific area together with the first user, when the number of the second users is less than or equal to the allowable number of people; and presenting an image of the second user to the first user when the number of the second users is less than or equal to the allowable number of people, and permit the second user to pass through the specific area, when the first user permits the second user included in the image as an accompanying person.

\*    \*    \*    \*    \*